US011299667B2

(12) United States Patent
Gardner et al.

(10) Patent No.: US 11,299,667 B2
(45) Date of Patent: Apr. 12, 2022

(54) FATTY ACID REACTION PRODUCTS OF DEXTRINS OR DEXTRAN FORMULATED WITH A SURFACTANT

(71) Applicant: Integrity Bio-Chemicals, LLC, Cresson, TX (US)

(72) Inventors: Christopher P. Gardner, Cresson, TX (US); Stephen William Almond, Creston, CA (US)

(73) Assignee: Integrity Bio-Chemicals, LLC, Cresson, TX (US)

( * ) Notice: Subject to any disclaimer, the term of this patent is extended or adjusted under 35 U.S.C. 154(b) by 0 days.

(21) Appl. No.: 17/343,033

(22) Filed: Jun. 9, 2021

(65) Prior Publication Data

US 2021/0340429 A1 Nov. 4, 2021

Related U.S. Application Data

(63) Continuation of application No. PCT/US2021/029826, filed on Apr. 29, 2021.
(Continued)

(51) Int. Cl.
*C11D 1/66* (2006.01)
*C11D 3/20* (2006.01)
(Continued)

(52) U.S. Cl.
CPC .............. *C09K 8/604* (2013.01); *C11D 1/66* (2013.01); *C11D 1/825* (2013.01); *C11D 1/835* (2013.01);
(Continued)

(58) Field of Classification Search
CPC .... C11D 1/66; C11D 1/90; C11D 3/22; C11D 3/221; C11D 3/222; C11D 3/2079
(Continued)

(56) References Cited

U.S. PATENT DOCUMENTS

| | | |
|---|---|---|
| 5,635,165 A | 6/1997 | Panitch |
| 5,750,678 A | 5/1998 | Bauer |

(Continued)

FOREIGN PATENT DOCUMENTS

| | | |
|---|---|---|
| CN | 111171088 B | 5/2020 |
| DE | 10200800327 A | 7/2009 |

(Continued)

OTHER PUBLICATIONS

International Search Report and Written Opinion for corresponding International Patent Application PCT/US2021/029826, dated Sep. 13, 2021.

(Continued)

*Primary Examiner* — Gregory R Delcotto
(74) *Attorney, Agent, or Firm* — Vorys, Sater, Seymour and Pease LLP

(57) ABSTRACT

Compositions comprising a neutral surfactant or a reaction product thereof and a reaction product of a saccharide polymer and a fatty acid may be obtained in the presence of water and a hydroxide base (optionally in the presence of the neutral surfactant), the saccharide polymer comprising a dextran, a dextrin compound, or any combination thereof. The reaction product of the saccharide polymer and the fatty acid may be present at a concentration effective to lower surface tension of the neutral surfactant. Depending on the fatty acid identity, among other factors, the compositions may promote emulsification or de-emulsification. In addition, the compositions may promote foam formation under appropriate conditions. Treatment fluids comprising the compositions, including foamed treatment fluids, may be introduced into a subterranean formation to perform a treatment operation in which fluid emulsification or de-emulsification may occur. The reaction products may be incorporated in soaps and other personal care products.

13 Claims, 10 Drawing Sheets

Related U.S. Application Data

(60) Provisional application No. 63/136,912, filed on Jan. 13, 2021, provisional application No. 63/080,060, filed on Sep. 18, 2020, provisional application No. 63/017,150, filed on Apr. 29, 2020.

(51) Int. Cl.

| | |
|---|---|
| *C11D 3/22* | (2006.01) |
| *C11D 3/32* | (2006.01) |
| *C09K 8/60* | (2006.01) |
| *C11D 1/825* | (2006.01) |
| *C11D 1/835* | (2006.01) |
| *C11D 1/94* | (2006.01) |
| *C11D 1/46* | (2006.01) |
| *C11D 1/90* | (2006.01) |
| *C11D 1/72* | (2006.01) |

(52) U.S. Cl.
CPC .............. *C11D 1/94* (2013.01); *C11D 3/2079* (2013.01); *C11D 3/22* (2013.01); *C11D 3/221* (2013.01); *C11D 3/222* (2013.01); *C09K 2208/28* (2013.01); *C11D 1/46* (2013.01); *C11D 1/662* (2013.01); *C11D 1/72* (2013.01); *C11D 1/90* (2013.01)

(58) Field of Classification Search
USPC ....... 510/119, 126, 130, 136, 137, 138, 470, 510/473, 474, 488, 505
See application file for complete search history.

(56) References Cited

U.S. PATENT DOCUMENTS

| | | | |
|---|---|---|---|
| 5,840,883 A | 11/1998 | Suzuki et al. | |
| 9,018,190 B2 | 4/2015 | Charvet et al. | |
| 2008/0014250 A1 | 1/2008 | Soula et al. | |
| 2012/0289451 A1* | 11/2012 | Glenn, Jr. | A61K 8/8129 512/4 |
| 2014/0155309 A1* | 6/2014 | Cotrell | C11D 17/0065 510/152 |
| 2018/0282385 A1* | 10/2018 | Cheng | C12P 19/18 |
| 2019/0169492 A1 | 6/2019 | Hill et al. | |

FOREIGN PATENT DOCUMENTS

| | | |
|---|---|---|
| GB | 800481 A | 8/1958 |
| JP | 1989203319 A | 8/1989 |
| JP | 2001058922 A | 3/2001 |
| JP | 2017071588 A | 4/2017 |

OTHER PUBLICATIONS

Zhang, K. et al., "Synthesis of long-chain fatty acid starch esters in aqueous medium and its characterization," European Polymer Journal, 2019, pp. 136-147, 119.

Ojogbo, E.C., "Starch Modification for Sustainable and Functional Material Applications," Masters Thesis, University of Waterloo, 2019, pp. 1-115.

Su, C.-M., et al., "Dextran-G-Lauric Acid as IKK Complex Inhibitor Carrier," RSC Adv., 2017, pp. 56247-56255, 7.

Yang, J., et al., The Biocompatability of Fatty Acid Modified Dextrin Agmatine Bioconjugate Gene Delivery Vector, Biomaterials, 2012, pp. 604-613, 33.

* cited by examiner

FATTY ACID REACTION PRODUCTS OF DEXTRINS OR DEXTRAN FORMULATED WITH A SURFACTANT

BACKGROUND

Amphiphilic compounds having both hydrophobic and hydrophilic regions within their molecular structure are commonly referred to as "surfactants" or "surfactant compounds." By virtue of their molecular structure, surfactants tend to lower the surface tension at an interface between two components. Surfactants may be found in a wide range of consumer and industrial products including, for example, soaps, detergents, cosmetics, pharmaceuticals, and dispersants. In addition, surfactants are also commonly used in the oil and gas industry. Among other functions in these applications and others, surfactants may promote solubility of an otherwise sparingly soluble solid, increase foaming, facilitate emulsification or de-emulsification, and/or lower viscosity in particular instances. Poor biodegradation, including slow biodegradation in liquid environments, and/or poor biocompatibility of some common synthetic surfactants may impact consumer and industrial products and processes incorporating such surfactants.

The recovery of hydrocarbon resources, such as oil and gas, from subterranean formations is often performed in conjunction with introducing one or more subterranean treatment chemicals downhole. As used herein, the terms "treat," "treatment," "treating," and grammatical equivalents thereof refer to any compound, fluid, or combination thereof that is introduced to a subterranean formation with the goal of achieving a desired function and/or for a desired purpose. A suitable treatment chemical may be selected based upon particular conditions present or anticipated to be present downhole. Environmental and regulatory concerns may also dictate suitable treatment chemicals that may be utilized in particular locales. Surfactants are a frequently employed class of treatment chemicals in the oilfield and may perform various functions downhole.

Oil and other hydrocarbon resources frequently may be present in emulsified form in a subterranean formation. In order to release emulsified oil and other hydrocarbon resources to facilitate production and/or processing thereof after production, a de-emulsifier may be used. Preventing an emulsion from forming downhole may also be desirable in many instances.

In other instances, introduction of an emulsified fluid into a subterranean formation may be desirable. Alternately, fluids that undergo emulsification downhole, promote emulsification downhole, invert an existing emulsion downhole, or change the wetting of a surface downhole may be used to promote an intended treatment outcome. In non-limiting examples, an emulsified fluid may have sufficient viscosity to carry particulates to or from the wellbore, such as proppant particulates, drill cuttings, or bridging agents as non-limiting examples. Emulsified fluids may likewise facilitate release of a hydrocarbon resource bound to the matrix of a subterranean formation by changing the surface wetting characteristics. Microemulsion fluids may be advantageous in many instances, such as by virtue of their optical clarity and more facile handling. Microemulsion fluids may likewise change surface wetting characteristics downhole or draw a hydrocarbon resource into the fluid during production.

In the foregoing applications, various types of surfactants may be used in the oil and gas industry to stabilize an emulsion or to promote de-emulsification of a fluid. In many instances, surfactants capable of promoting emulsification or de-emulsification have completely different chemical structures from one another, and a general class of surfactant compounds is not readily tunable to the particular conditions that may be present downhole. Some common surfactants may be expensive, have poor aqueous solubility, and/or be subject to environmental and/or other government regulations. In addition, some emulsifying or de-emulsifying agents have high surface tension and intrafacial tension values at the critical micelle concentration and may not be easily pumped downhole. These issues may present related barriers when formulating consumer and industrial products containing surfactants.

In addition to their frequent use in facilitating emulsification or de-emulsification in various industries and consumer products, surfactants are also commonly employed for promoting foam formation in aqueous fluids. Foaming properties of soaps, detergents, shampoos and similar consumer products are familiar examples. Foamed treatment fluids are also frequently employed in oil and gas production as well. As used herein, the term "foam" refers to a stabilized dispersion of a large volume of gas in the form of bubbles of varying sizes in a relatively small volume of liquid. The term "foam quality" refers to the percentage of gas in a volume of foam and may be calculated by dividing the quantity (total foam volume–liquid volume) by the total foam volume. Ionic surfactants are among the most commonly used type of surfactants for promoting foaming. However, ionic surfactants can lead to incompatibilities with other types of materials, such as divalent ions, and some may be subject to regulatory constraints, especially when used in large quantities. In addition, ionic surfactants may sometimes afford inconsistent foam performance at higher temperatures.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1A:
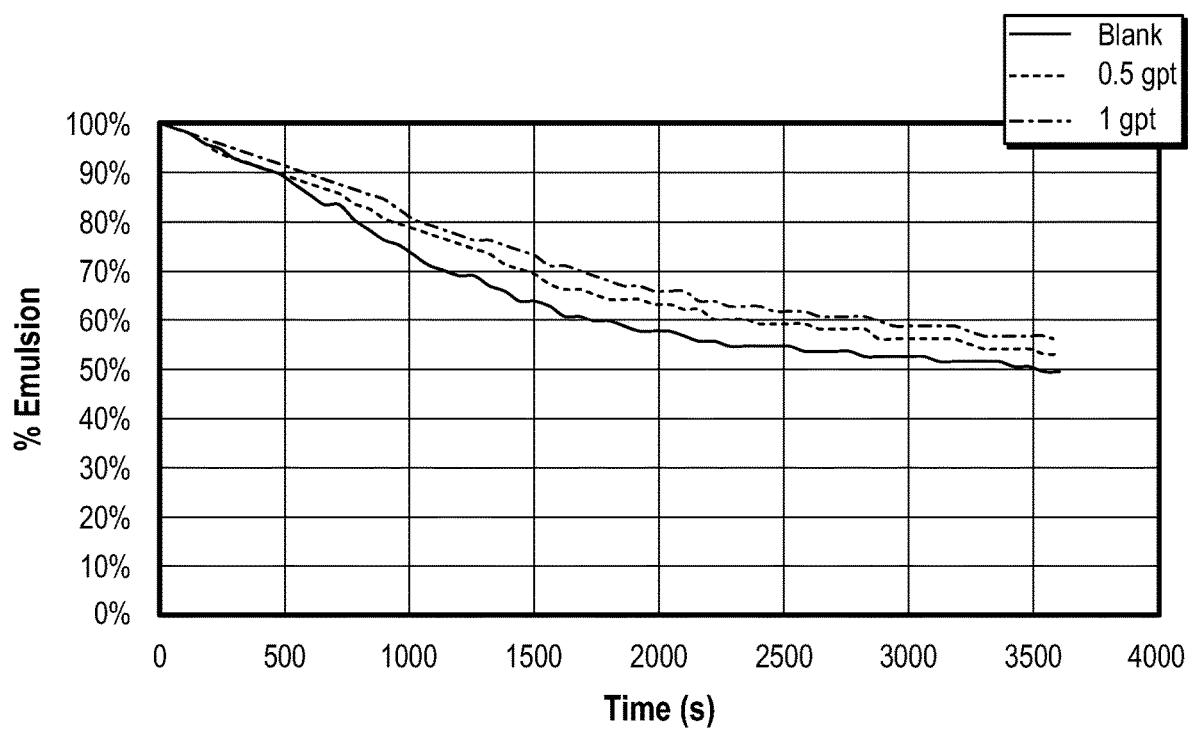
FIGS. 1A-1D show plots of percent emulsification as a function of time for Terero oil emulsified with Samples A-D, respectively.
Figure 1B:
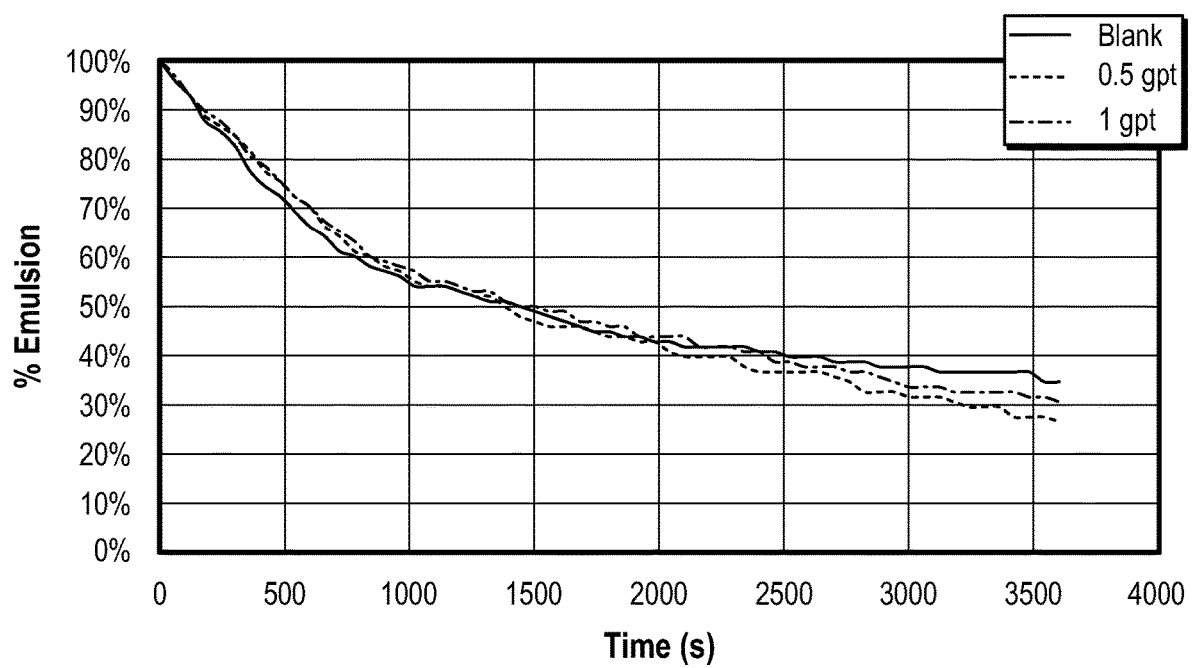
Figure 1C:
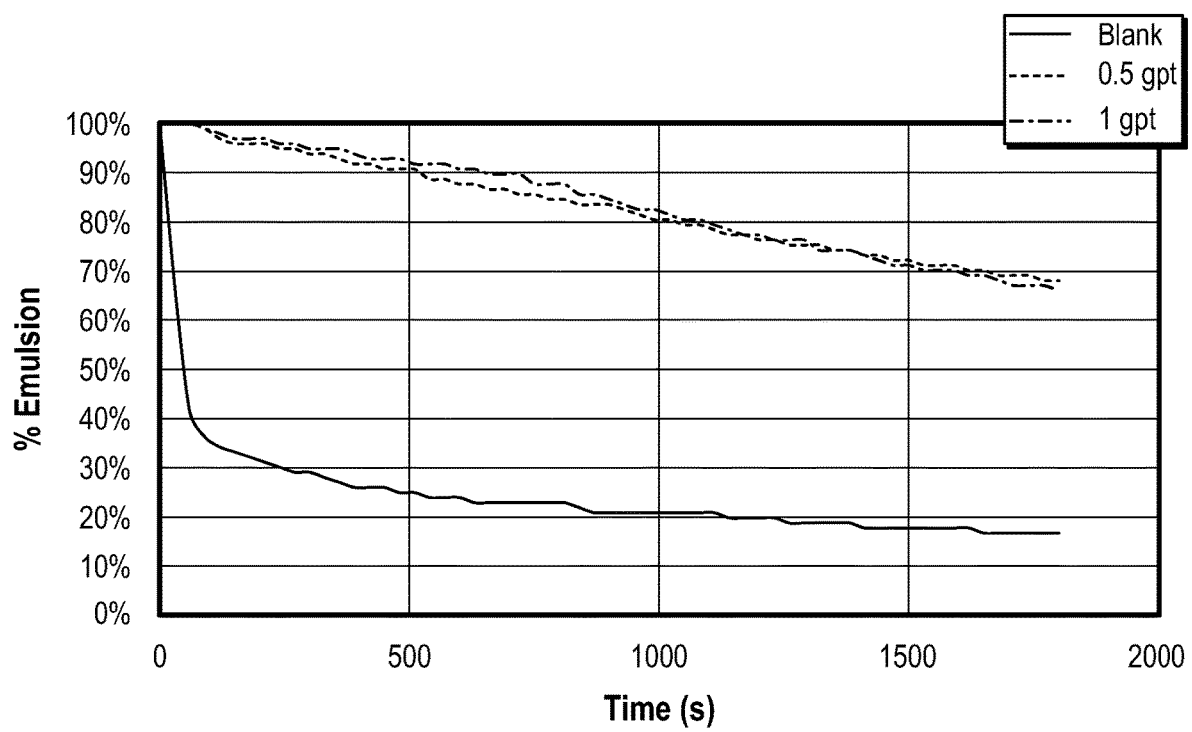
Figure 1D:
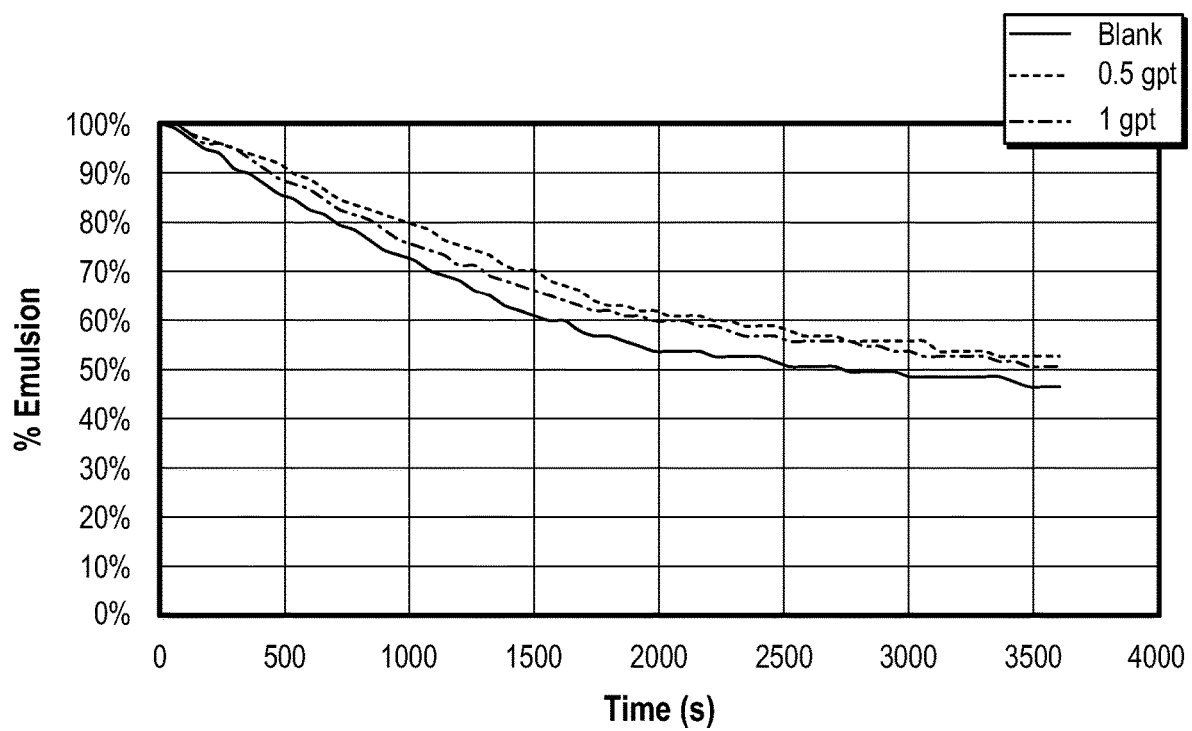
Figure 2A:
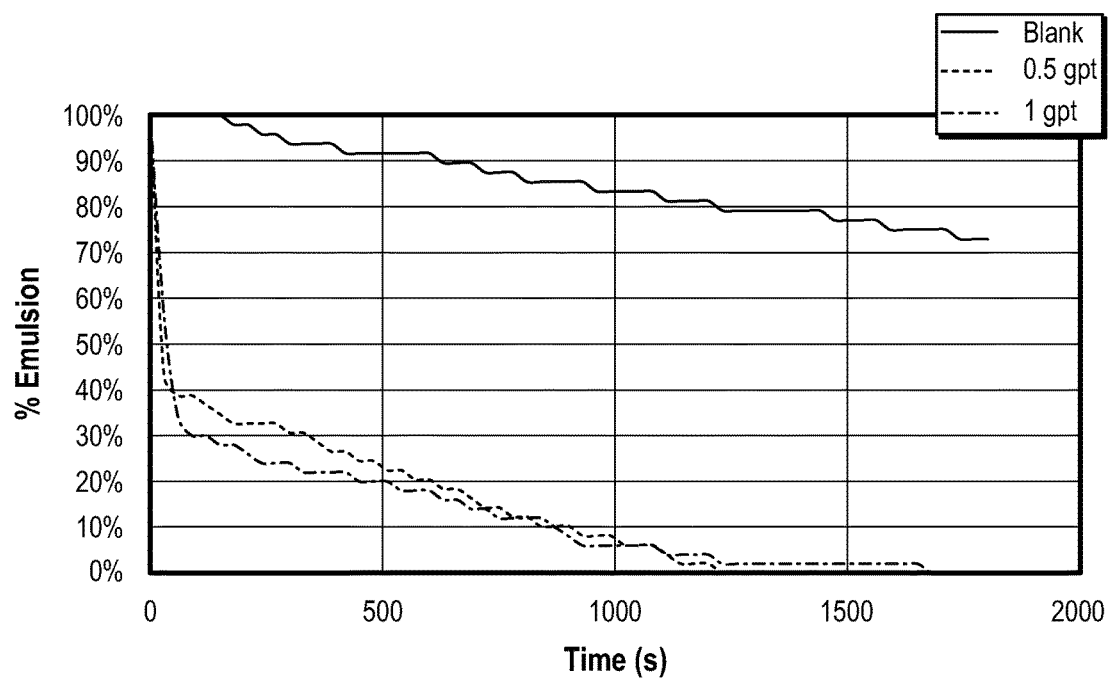
FIGS. 2A-2D show plots of percent emulsification as a function of time for Wolfcamp A oil emulsified with Samples A-D, respectively.
Figure 2B:
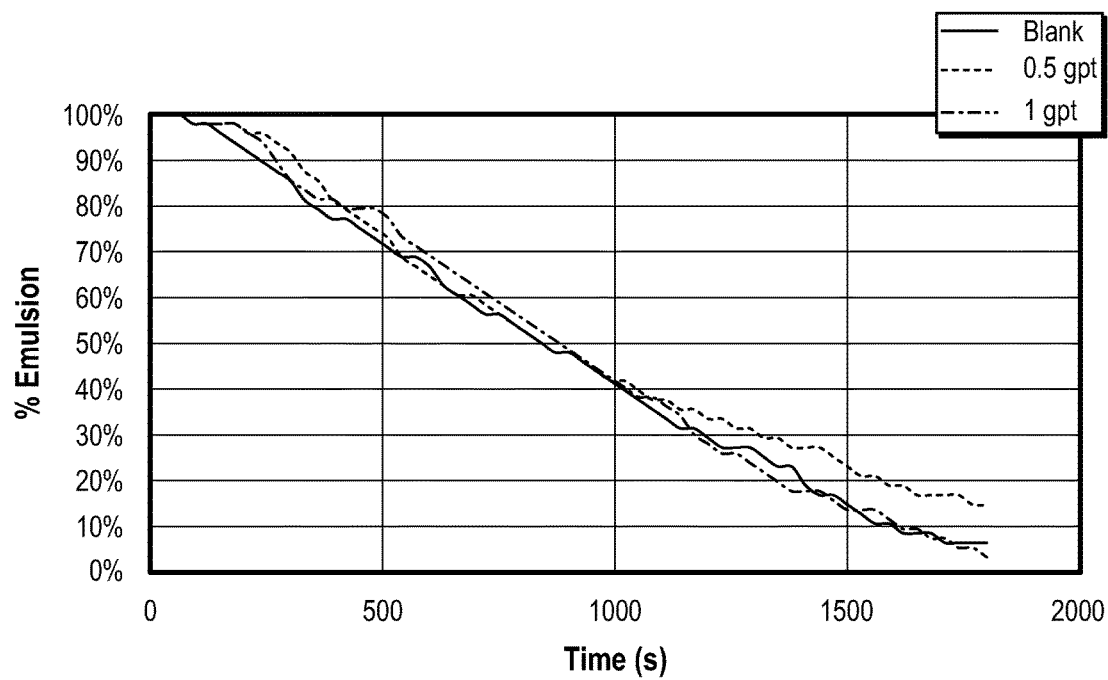
Figure 2C:
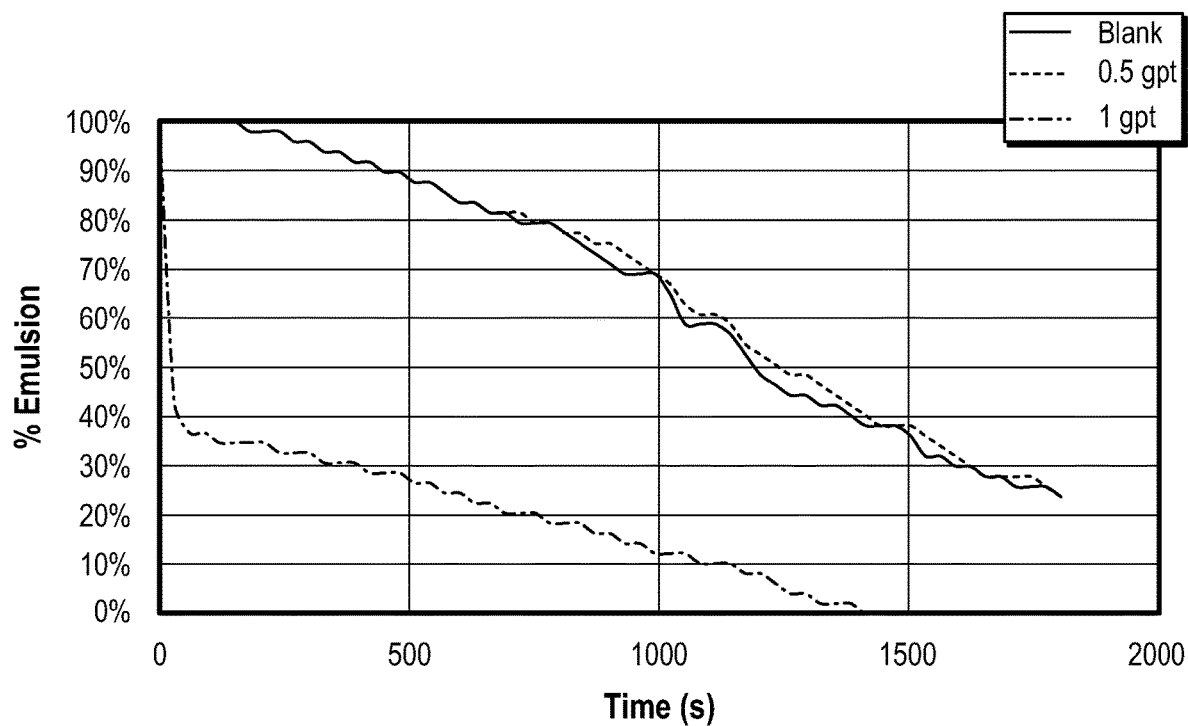
Figure 2D:
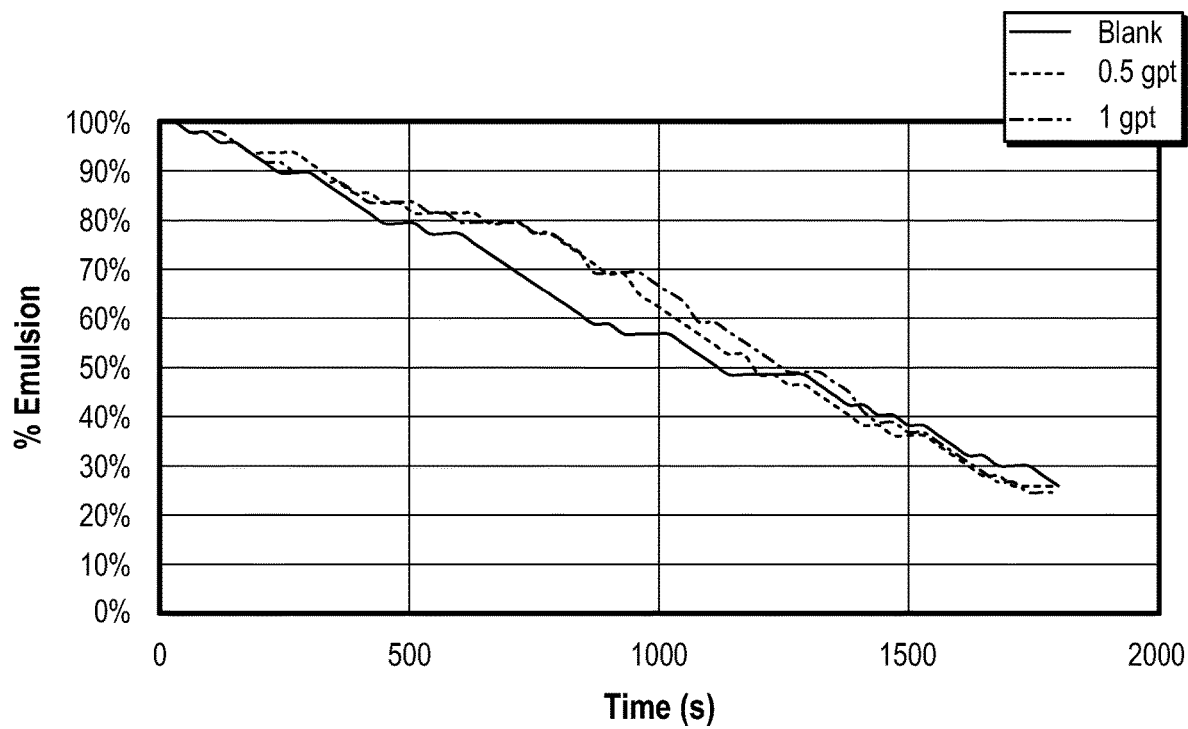
Figure 3A:
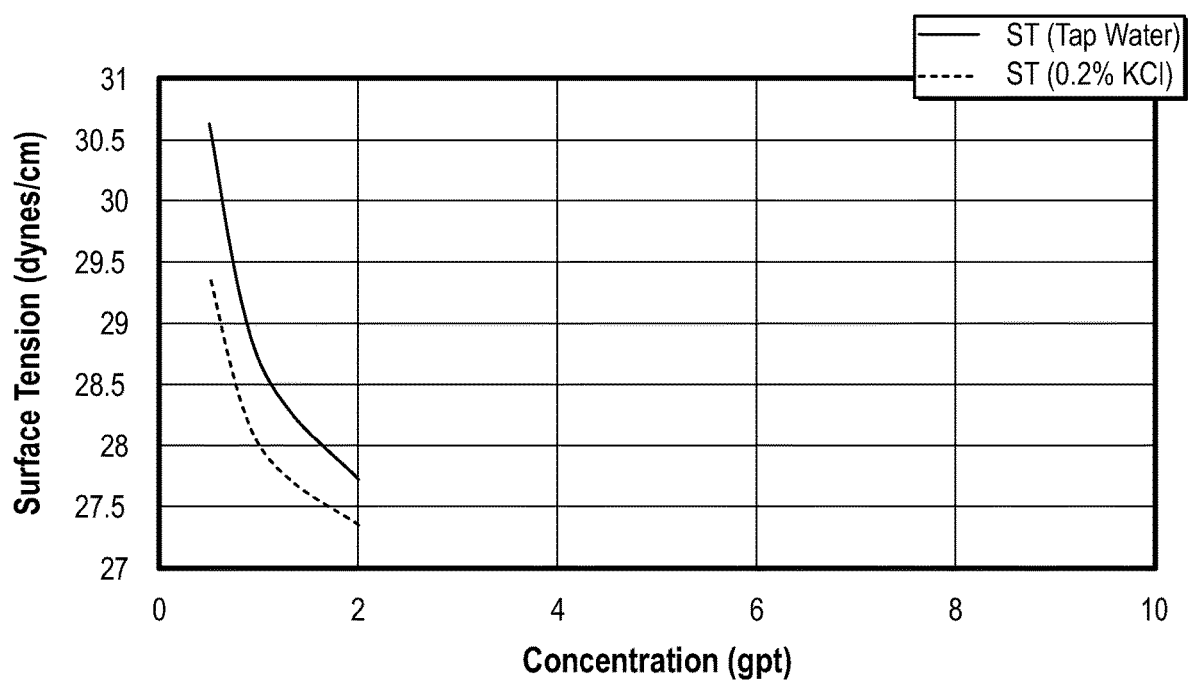
FIGS. 3A-3D show plots of surface tension as a function of concentration for Samples A-D, respectively.
Figure 3B:
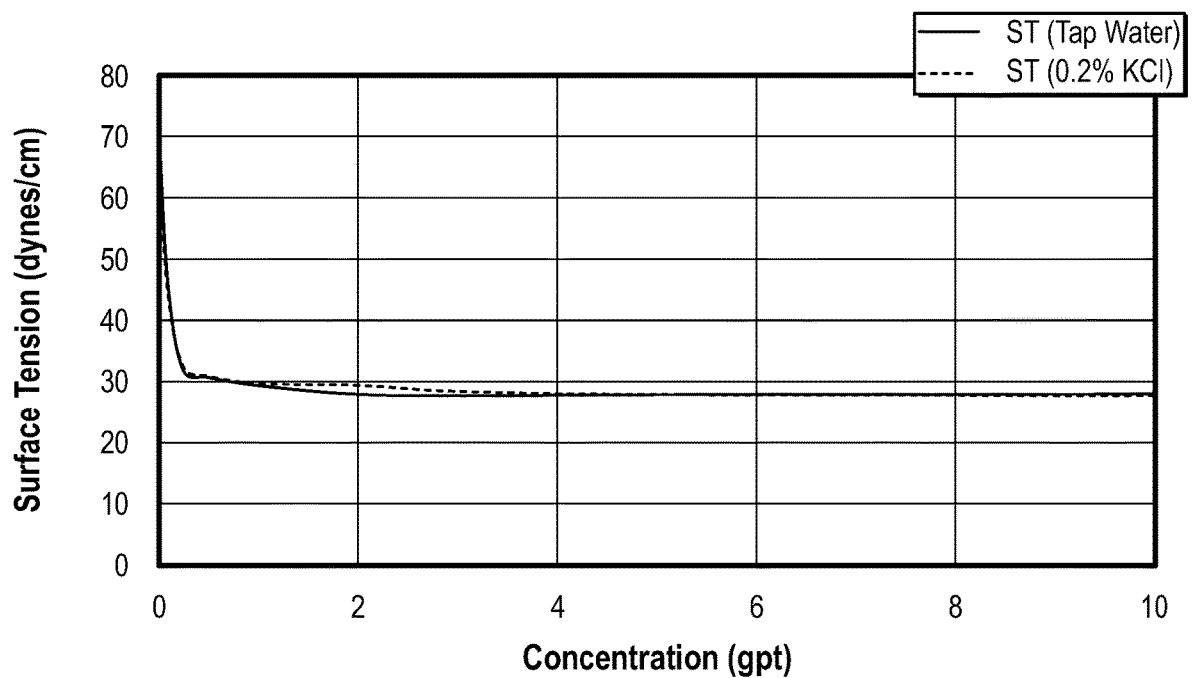
Figure 3C:
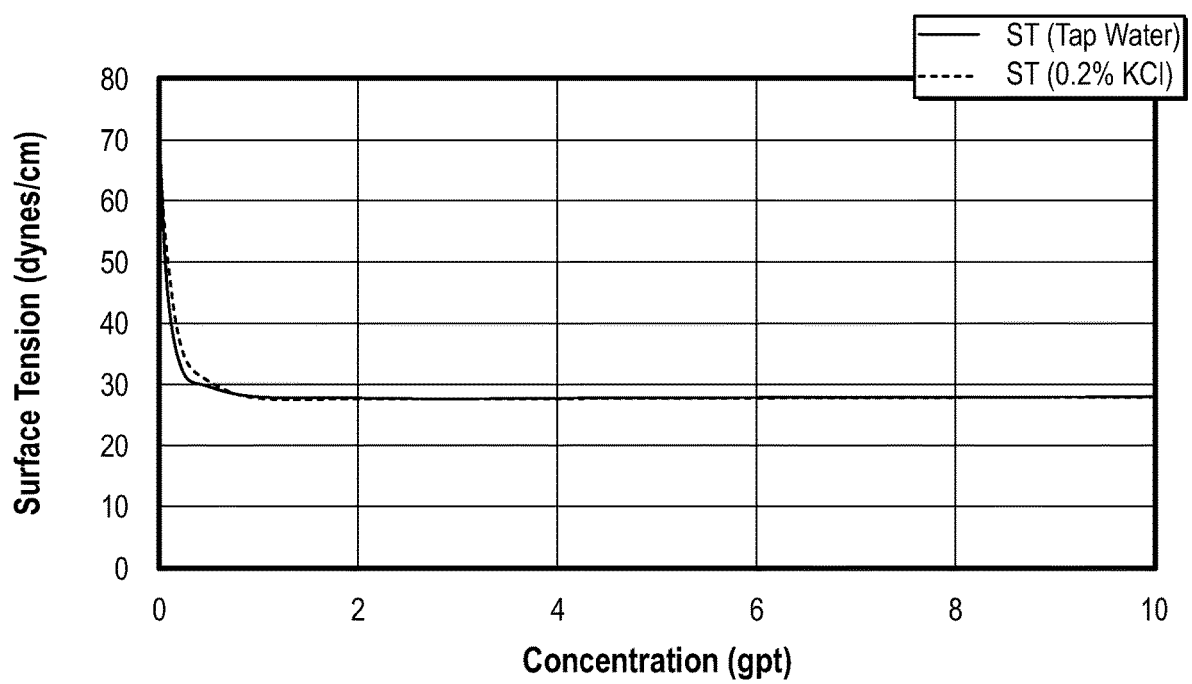
Figure 3D:
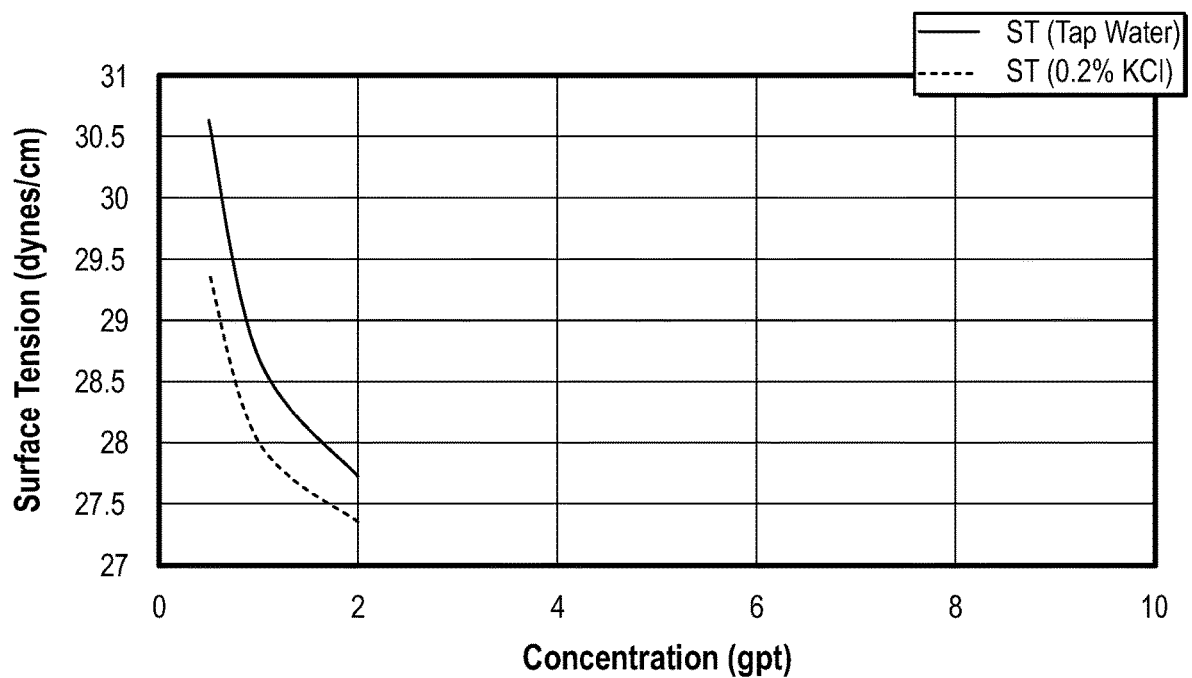
Figure 4A:
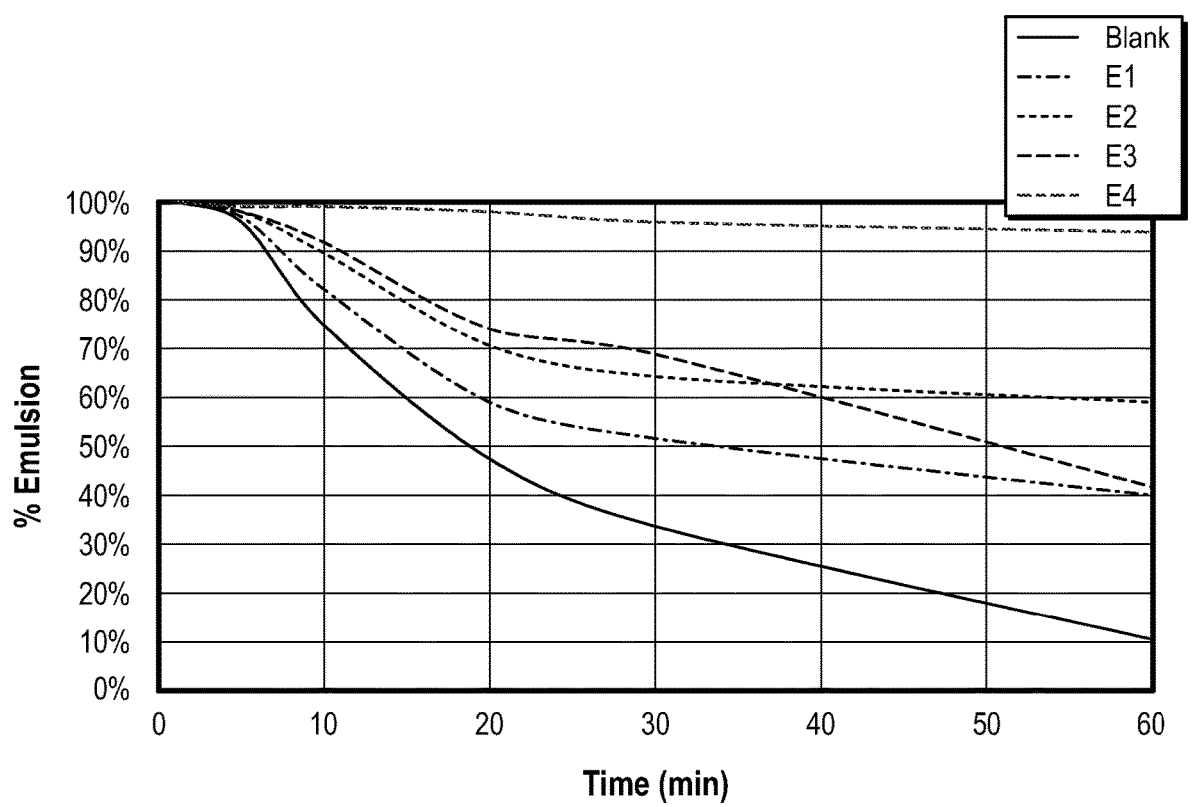
FIGS. 4A-4D show plots of percent emulsification as a function of time for East Texas Hutcheson #2 oil emulsified with Samples E1-E4, F1-F4, G1-G4, and H1-H4.
Figure 4B:
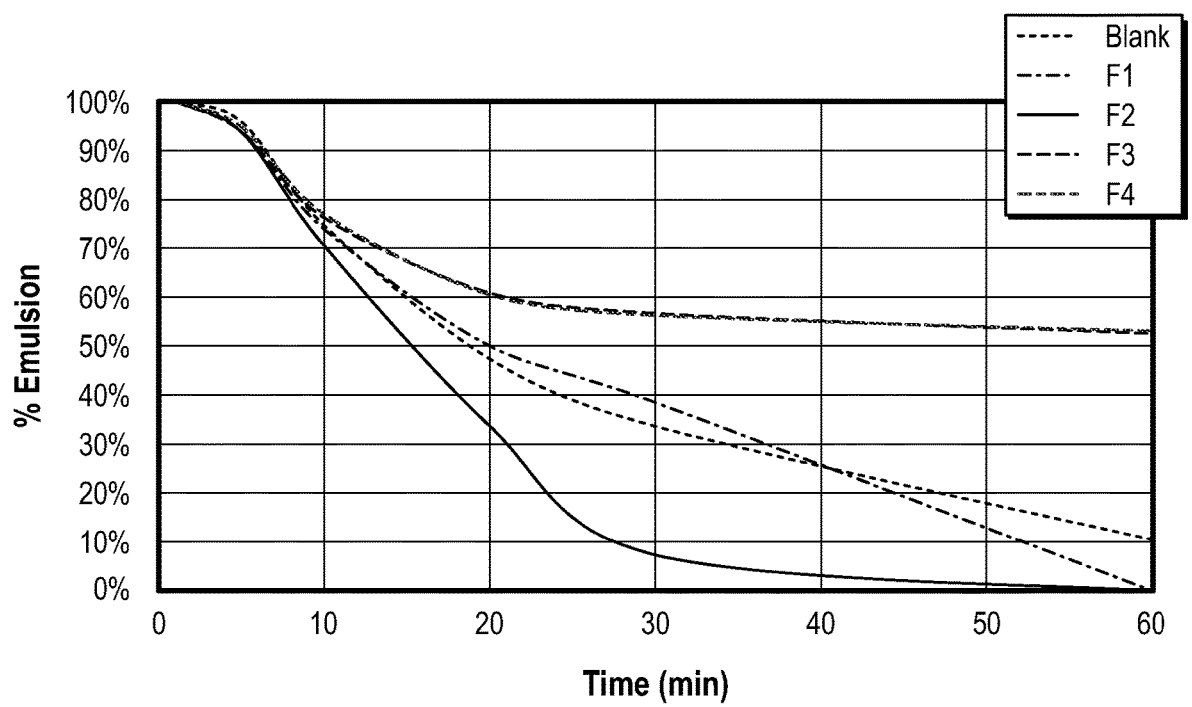
Figure 4C:
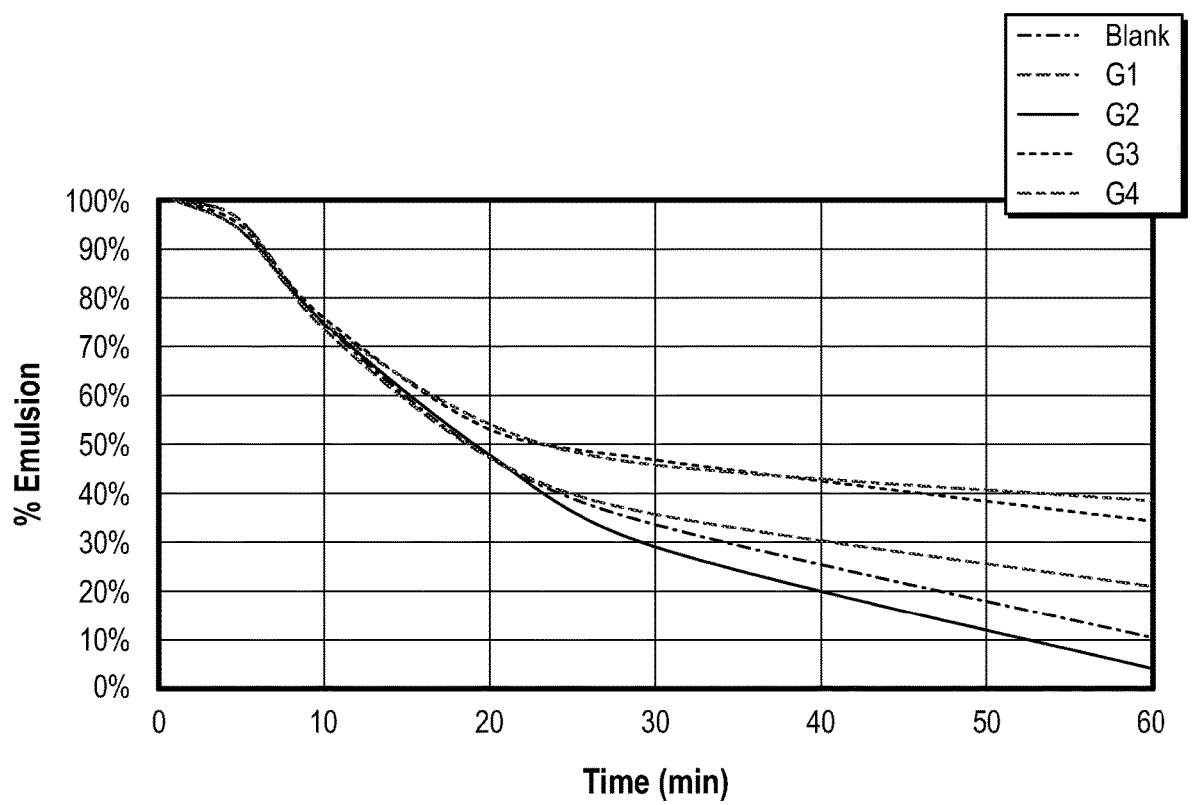
Figure 4D:
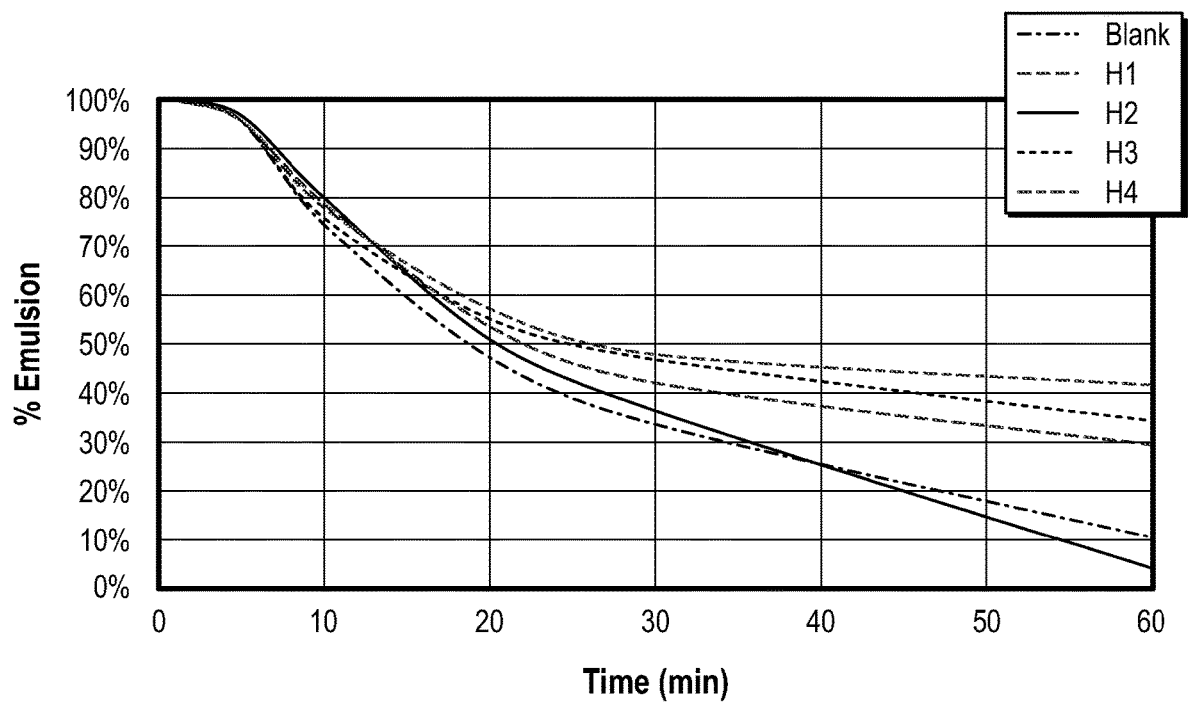

The present disclosure generally relates to surfactant technology and, more specifically, compositions having a low surface tension that may emulsify, de-emulsify, viscosify or foam a fluid. In some emulsion applications, the compositions may form microemulsions. Various industrial and consumer products may be formed from the compositions, including foamed or foamable compositions.

As discussed above, emulsion management may be desirable when producing a hydrocarbon resource from a subterranean formation. In some instances, it may be suitable for an emulsion to be present, such as to promote transportation of solids to or from a subterranean formation or to change the wetting characteristics of a surface within a wellbore. In other instances, it may be advantageous to break an emulsion to allow production of a hydrocarbon resource to take place. Surfactants of various types may be used for these purposes, as well as being found in a wide array of industrial and consumer products. Oftentimes, surfactants having vastly different structures are used to promote emulsification and de-emulsification. Surface tension (interfacial tension) and intrafacial tension values are frequently high for some types of surfactants as well, and some may be subject to regulatory constraints. In addition, some types of surfactants, particularly anionic surfactants, may deleteriously interact with components that may be present in a fluid, such as salts.

Surfactants also may be utilized to promote foaming of a fluid. In addition to the familiar presence of foams associated with household and personal care products, such as soaps and detergents, foams are frequently utilized in oil and gas production as a specialty treatment fluid. When used to promote foaming in these and other applications, surfactants may present some of the same types of issues as those encountered when promoting emulsification or de-emulsification. In addition, ionic surfactants may lead to inconsistent foam performance in certain instances, especially at higher temperatures and in the presence of certain metal cations.

The present disclosure provides biopolymer-based compounds that may be produced with tunable addends (e.g., to adjust hydrophilic-lipophilic balance (HLB)) to promote emulsification or de-emulsification depending on how the biopolymer is functionalized, including when combined with a suitable neutral surfactant. Namely, the present disclosure provides saccharide polymers comprising dextran or dextrin compounds that are reacted with fatty acids, preferably under alkaline conditions and optionally in the presence of the neutral surfactant, to afford reaction products having surfactant-modifying properties and unexpectedly low surface tension values when present in combination with a suitable surfactant. Without being limited by theory, the reaction products may include at least one fatty ester of the dextran or dextrin compound, which interact synergistically with the neutral surfactant to afford the low surface tension values. Components forming the reaction products individually tend to raise surface tension values, but once all combined together in a reaction product may surprisingly lower the surface tension of cocamide diethanolamine (CocoDEA) and similar neutral surfactants, possibly after further reaction of a primary alcohol functionality thereof. Similar neutral surfactants that may function in a like manner may include, but are not limited to, other fatty acid amide alkanolamines, such as those formed from palmitic acid and ethanolamine or diethanolamine, for example. Dextrin compounds also have primary alcohol functionalities, as well as secondary alcohol functionalities, that may undergo reaction with a fatty acid to form a reaction product according to the present disclosure. The reaction products may be advantageous due to their biological origin, low cost and ability to afford low surface tension values when present in combination with a neutral surfactant. Moreover, the chain length of the fatty acid component of the reaction products may aid in tailoring the properties obtained therefrom, including determining whether emulsifying or de-emulsifying performance results in a particular circumstance. Reaction products of maltodextrin represent a particularly useful class of dextrin-based reaction products.

In addition, reaction products having a sufficiently high hydrophilic-lipophilic balance (HLB) may promote foaming of formulations, including when combined with one or more suitable surfactants. The combination of a neutral surfactant and reaction products of the present disclosure may promote ready foaming of an aqueous fluid, and may afford a more stable foam than does a comparable mass of ionic surfactant, including cationic, anionic, or zwitterionic surfactants. A zwitterionic surfactant may optionally be combined with the reaction products to improve foaming performance relative to the reaction products and a neutral surfactant alone. For example, when combined with CocoDEA, other fatty acid amide alkanolamines or a reaction product thereof, a reaction product formed from maltodextrin and lauric acid may generate a less dense and more stable foam than does a substantially equivalent amount of sodium lauryl sulfate (sodium dodecyl sulfate), an anionic surfactant that is commonly used in personal care products such as soaps and shampoos. Given the biomolecule nature of the reaction products, foamed or foamable formulations comprising one or more reaction products of the present disclosure may represent a more environmentally friendly approach for formulating soaps and other personal care products.

In addition to affording foamed or foamable formulations based upon neutral surfactant technology, the reaction products of the present disclosure may fully or partially replace more costly surfactants and/or surfactants subject to government regulations in various industrial or consumer products. For example, the reaction products of the present disclosure may be an effective replacement for ethyoxylated alcohol neutral surfactants. The lowering of surface tension afforded by the reaction products of the present disclosure in combination with a neutral surfactant may be advantageous when replacing a less desirable surfactant.

Maltodextrins represent an advantageous saccharide polymer for use in the disclosure herein in terms of their low cost, environmentally benign nature, and the relative ease with which they may be chemically reacted with fatty acids having a range of chain lengths. Depending on the fatty acid reacted with a maltodextrin, the hydrophobic-lipophilic balance (HLB) of the reaction products may range from about 5 to about 20 or more, wherein known molecular contributions may be utilized to calculate the HLB value. Thus, maltodextrin reaction products may be effective for forming emulsions in substantially water-based fluids or substantially oil-based fluids, with a particular fatty acid being selected for reaction with maltodextrin based upon the particular conditions and type of hydrocarbon resource present downhole or needed when formulating a given product. Likewise, such maltodextrin reaction products may promote foaming if the HLB is sufficiently large. In addition to the property variation resulting from the fatty acid size, maltodextrins are available in a range of oligomer sizes (e.g., 3-20 glucose monomers, or even up to about 25 glucose monomers), which may allow some further tailoring of the emulsifying or foaming properties to be realized. As such, maltodextrin reaction products may offer numerous advantages and a wide range of applicability for use downhole and in other applications in which surfactants are commonly used, such as in soaps and other personal care products.

Dextran reaction products may offer similar advantages and features to those of maltodextrin reaction products, including the ability to produce low surface tension values, and be formed and used under similar conditions.

Dextrin compounds suitable for use in the present disclosure may comprise 2 to about 20 glucose monomers, or even up to about 25 glucose monomers, linked together with α(1,4) glycosidic bonds. At least a portion of the glucose monomers may form a reaction product upon being contacted under suitable conditions with a fatty acid salt, such as a salt of a $C_4$-$C_{30}$ fatty acid or a $C_4$-$C_{20}$ fatty acid. Without being limited by theory, at least a portion of the glucose monomers may react to form a fatty ester of the dextrin compound in some embodiments, optionally present in combination with unreacted fatty acid salt in an aqueous phase. When formed, an ester reaction product may form at any hydroxyl group of the dextrin compound, including any combination of primary and/or secondary hydroxyl groups. Hydroxyl groups upon the neutral surfactant may undergo a reaction under similar conditions.

Dextran is a saccharide polymer characterized by predominantly α(1,6) glycosidic bonds between adjacent glucose monomers, with a limited number of glucose side chains linked to the main polymer backbone via α(1,3) glycosidic bonds. The α(1,3) glycosidic bonds may introduce crosslinks between adjacent saccharide polymer chains. Depending on the biological source, the extent of branching and the molecular weight of dextran may vary considerably, any of which may be utilized in the disclosure herein. At least a portion of the glucose monomers in dextran may form a reaction product upon being contacted under suitable conditions with a fatty acid salt, such a salt of a $C_4$-$C_{30}$ fatty acid or a $C_4$-$C_{20}$ fatty acid. Without being limited by theory, at least a portion of the glucose monomers may react to form a fatty ester of the dextran in some embodiments, optionally present in combination with unreacted fatty acid salt in an aqueous phase. When formed, an ester reaction product may form at any hydroxyl group of the dextran.

In some embodiments, reaction products of the present disclosure may include a dextrin compound having 3 to about 20 glucose monomers, or even up to about 25 glucose monomers, that are covalently linked by α(1,4) glycosidic bonds. Formula 1 below shows the generic structure of a dextrin compound having only α(1,4) glycosidic bonds between adjacent glucose monomers, wherein variable 'a' is a positive integer ranging from 1 to about 18, thereby providing a dextrin backbone with 3 to about 20 glucose monomers. In the case of a dextrin compound containing up to 25 glucose monomers, variable 'a' may range from 1 up to about 23. The terminal glucose unit is shown in its closed form, but may also be present in the corresponding reducing sugar form as well.

Formula 1

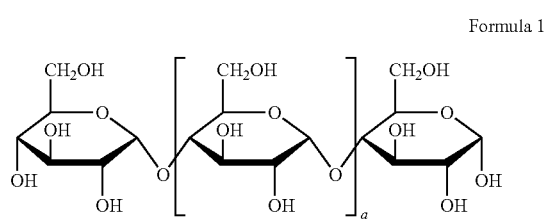

Other dextrin compounds may contain only α(1,6) glycosidic bonds or a mixture of α(1,4) and α(1,6) glycosidic bonds, and such dextrin compounds may also be suitable for use in forming the reaction products. Particularly suitable dextrins may have a molecular weight (e.g., $M_n$) in the range of about 1200 to about 1400 or about 1100 to about 1500.

In some or other embodiments, the reaction products may include a dextran obtained from any suitable source. The structure of dextran is shown in Formula 2 below, in which the α(1,3) glycosidic bonds are not shown in the interest of clarity. Where they occur, the α(1,3) glycosidic bonds may append a terminal glucose monomer as a side chain to the α(1,6)-linked saccharide polymer backbone, form crosslinks between adjacent α(1,6)-linked saccharide polymer backbones, interrupt the α(1,6)-linked saccharide polymer backbone with an α(1,3) glycosidic bond, or any combination thereof. Depending on source, up to about 5% of the glucose monomers may be linked by α(1,3) glycosidic bonds. Linkage by α(1,3) glycosidic bonds may occur upon any of the glucose monomers. The numbering of a single glucose monomer is shown in Formula 3 below.

Formula 2

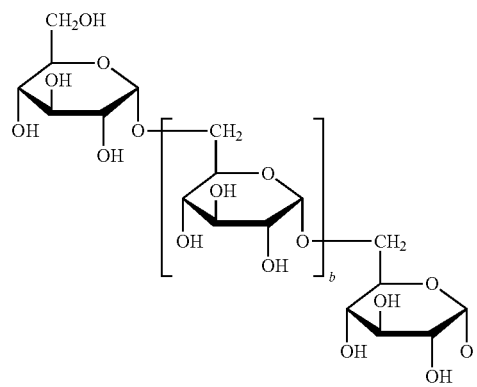

Suitable dextrans may have a molecular weight of about 1200, or about 1400, or about 5000 up to about 50,000,000 or about 100,000 up to about 20,000,000. As such, variable 'b' may range from about 30 to about 300,000 depending on the particular dextran selected. Particularly suitable dextrans may have a molecular weight (e.g., $M_n$) ranging from about 1200 to about 1400, or about 1100 to about 1500, or about 100,000 to about 1 million, or about 2 million to about 5 million. Another suitable dextran may have a molecular weight of about 500,000 and an activity level of about 9%.

Formula 3

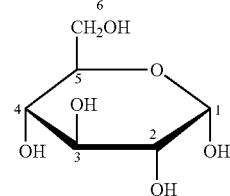

The saccharide polymer may comprise a maltodextrin according to some embodiments of the present disclosure. Maltodextrins may be characterized in terms of their dextrose equivalent (DE) value. Dextrose equivalent is a measure of the amount of reducing sugars (e.g., glucose monomers) that are present in a saccharide polymer, particularly a dextrin, expressed as a percentage relative to dextrose. Starch, which is functionally non-reducing, has a defined dextrose equivalent of 0, whereas dextrose itself has a dextrose equivalent of 100. Dextrose equivalent may be calculated by dividing the molecular weight of glucose by $M_n$ and multiplying the result by 100. Higher dextrose equivalent values are characteristic of a lower number of covalently linked glucose monomers (shorter polymer backbone length, thereby providing a higher relative percentage of terminal reducing sugars). Maltodextrins suitable for forming a reaction product with one or more fatty acids according to the disclosure herein may exhibit dextrose equivalent values ranging from 3 to about 25 or from 3 to about 20. In more specific embodiments, dextrose equivalent values of the maltodextrins may range from about 4.5 to about 7.0, or from about 7.0 to about 10.0, or from about 9.0 to about 12.0.

Maltodextrins suitable for forming a reaction product may be obtained from hydrolysis or pyrolysis of starch, specifically the amylose component of starch, according to some embodiments. A maltodextrin having Formula 1 may be formed by hydrolysis or pyrolysis of amylose, for example. Alternative suitable dextrins may be obtained from hydrolysis or pyrolysis of the amylopectin component of starch, in which case the dextrin may contain $\alpha(1,6)$ glycosidic bonds if the dextrin is obtained through hydrolysis of the amylopectin side chain. Starches from which the dextrins may be subsequently produced may be obtained from any starch source.

Accordingly, reaction products of the present disclosure may comprise a first reaction component comprising a saccharide polymer selected from a dextran, a dextrin compound, or any combination thereof and a second reaction component comprising one or more fatty acids. The reaction products may be obtained in the presence of water and a hydroxide base. Suitable hydroxide bases may include, for example, alkali metal hydroxides, such as sodium hydroxide, potassium hydroxide, or any combination thereof. A stoichiometric excess or a stoichiometric deficit of the hydroxide base relative to the one or more fatty acids may be present. Optionally, the reaction product may be formed in the presence of a neutral surfactant.

A molar ratio of fatty acid to glucose monomers in the reaction product may be about 0.05 or above on a basis of $\text{moles}_{fatty\ acid}:\text{moles}_{glucose\ monomers}$, or about 0.08 or above on a basis of $\text{moles}_{fatty\ acid}:\text{moles}_{glucose\ monomers}$, or about 0.1 or above on a basis of $\text{moles}_{fatty\ acid}:\text{moles}_{glucose\ monomers}$, or about 0.2 or above on a basis of $\text{moles}_{fatty\ acid}:\text{moles}_{glucose\ monomers}$, or about 0.3 or above on a basis of $\text{moles}_{fatty\ acid}:\text{moles}_{glucose\ monomers}$, or about 0.4 or above on a basis of $\text{moles}_{fatty\ acid}:\text{moles}_{glucose\ monomers}$, or about 0.5 or above on a basis of $\text{moles}_{fatty\ acid}:\text{moles}_{glucose\ monomers}$, or about 0.6 or above on a basis of $\text{moles}_{fatty\ acid}:\text{moles}_{glucose\ monomers}$, or about 0.7 or above on a basis of $\text{moles}_{fatty\ acid}:\text{moles}_{glucose\ monomers}$, or about 0.8 or above on a basis of $\text{moles}_{fatty\ acid}:\text{moles}_{glucose\ monomers}$, or about 0.9 or above on a basis of $\text{moles}_{fatty\ acid}:\text{moles}_{glucose\ monomers}$. A maximum ratio of fatty acid to dextrin or dextran in the reaction product, based upon glucose monomers, may be about 1.0 in most cases. The foregoing ratios may represent a molar ratio of fatty acid reacted with the dextran or dextrin compound. One or more hydroxyl groups per glucose monomer may undergo a reaction in some cases. At least a portion of the glucose monomers may remain unfunctionalized. Unreacted carboxylic acids, if any, may remain in the reaction product as a free carboxylate salt of the hydroxide base. As such, reaction products of the present disclosure may comprise one or more dextrin fatty esters and/or one or more dextran fatty esters, optionally in further combination with a fatty acid carboxylate (e.g., an alkali metal carboxylate), and a hydroxide base (e.g., an alkali metal hydroxide base). The hydroxide base may be present in at least a sufficient molar quantity to react with substantially all of the fatty acid that is present to form an alkali metal carboxylate. The hydroxide base may be neutralized with an acid or removed through washing, and the reaction products may maintain their ability to afford a low surface tension.

Compositions of the present disclosure may comprise a neutral surfactant and/or a zwitterionic surfactant in combination with the foregoing reaction products. Surprisingly, the reaction products of the present disclosure may promote lowering of the surface tension of the neutral surfactant or zwitterionic surfactant. That is, the reaction product may be present in an effective concentration to lower the surface tension relative to that produced by the neutral surfactant or the zwitterionic surfactant alone at a substantially similar concentration. Neutral surfactants may be useful due to their already-low surface tension values. When combined with the saccharide polymer during formation of the reaction product, alcohol groups upon a neutral surfactant may form a reaction product, such as with the fatty acid, as well.

Suitable neutral surfactants that may have their surface tension lowered in combination with a reaction product include cocoamide-based surfactants such as cocamide diethanolamine, cocamide monoethanolamine, cocamide monoisopropanolamine, cocamide diisopropanolamine, and the like. Cocamide diethanolamine (CocoDEA) may be a suitable neutral surfactant for use in the disclosure herein. Other neutral surfactants that may be suitable include additional fatty acid amide alkanolamines, such as palmitic acid amide diethanolamine or monoethanolamine. In the compositions of the present disclosure, such neutral surfactants may be present at a concentration of about 20 wt. % or less, or about 10 wt. % or less, or about 5 wt. % or less, such as about 1 wt. % to about 10 wt. %, or about 3 wt. % to about 8 wt. %.

Betaine surfactants are a type of zwitterionic surfactant. Since the net charge of zwitterionic surfactants is zero, they also may be considered to constitute neutral surfactants in the disclosure herein. Zwitterionic surfactants, such as cocamidopropyl betaine, may also be present in the compositions of the present disclosure in some instances, either alone or in combination with a neutral surfactant, particularly when producing foamable formulations comprising the reaction products. Zwitterionic surfactants may likewise have their surface tension lowered when combined with the reaction products.

Once formed, the pH of the reaction products disclosed herein may reside within a range of about 1 to about 14, such as a range of about 1 to about 5, or about 5 to about 7, or about 7 to about 9, or about 9 to about 14. Lower surface tension values may be realized as the pH decreases in some instances. Decreased surface tension may also be realized in the presence of dissolved salt, such as potassium chloride.

Reaction products of the present disclosure, which may include those formed through a reaction of one or more fatty acids with dextrin compounds and/or a dextran, may be prepared by a process comprising: heating a saccharide polymer comprising a dextran, a dextrin compound (e.g., comprising 3 to about 20 glucose monomers, or even up to about 25 glucose monomers, linked together with $\alpha(1,4)$ glycosidic bonds), or any combination thereof, a fatty acid and a hydroxide base in water, obtaining a reaction product of the saccharide polymer and the fatty acid in an aqueous phase, and combining a neutral surfactant or optionally a reaction product thereof, such as a cocamide-based surfactant, or a zwitterionic surfactant with the reaction product in the aqueous phase. The reaction product may be combined with the neutral surfactant or zwitterionic surfactant in an amount effective to decrease the surface tension relative to the surfactant alone at a like concentration. Any of the reaction products of a dextran or dextrin compounds may constitute a suitable saccharide polymer for forming compositions having a low surface tension. Heating may be conducted at a temperature of about 100° C. or less, such as at about 50° C. to about 80° C., or about 60° C. to about 70° C., or about 50° C. to about 60° C.

The reaction product may be formed in the presence of the neutral surfactant or zwitterionic surfactant, or the neutral surfactant or zwitterionic surfactant may be combined after formation of the reaction product has been completed. For example, the reaction product may be precipitated and subsequently be redissolved in an aqueous solution containing the neutral surfactant or zwitterionic surfactant. In some embodiments, the reaction products may be formed in the presence of or be combined with a neutral surfactant due to the low surface tension values that may be obtained. When present during formation of the reaction product, a reaction product of a neutral surfactant having hydroxyl groups may be formed.

When a neutral surfactant is used, surface tension values for the compositions may be about 40 dynes/cm or less, or about 38 dynes/cm or less, or about 36 dynes/cm or less, or about 34 dynes/cm or less, or about 32 dynes/cm or less, or about 30 dynes/cm or less, or about 28 dynes/cm or less. The surface tension may be largely governed by the amount of neutral surfactant that is present, with the chosen amount of neutral surfactant being selected to provide a desired extent of surfactancy applicable to a given application. At the chosen amount of neutral surfactant, the reaction product may be present in an amount sufficient to lower the surface tension in comparison to the surface tension that would otherwise be obtained for the surfactant alone at a substantially identical concentration. Corresponding intrafacial tension values for the compositions may be about 10 dynes/cm or less.

In forming the reaction products of the present disclosure, methods of the present disclosure may comprise combining the fatty acid, the hydroxide base, and the neutral surfactant and/or zwitterionic surfactant in water to form a mixture, and heating the mixture until the fatty acid dissolves and a homogeneous mixture forms. Thereafter, the methods may comprise combining the saccharide polymer with the homogeneous mixture and continuing to heat until the reaction product has formed to a sufficient degree. The resulting aqueous mixture may be utilized directly in further applications, optionally after concentration or dilution, by being further combined with additional components targeted for a particular formulation. Formulations and products in which aqueous mixtures of the reaction products may be utilized are discussed hereinbelow. In some instances, the aqueous mixture may at least partially replace another surfactant in a specific formulation, such as a charged surfactant. In other instances, the aqueous mixture may at least partially replace an ethoxylated alcohol surfactant in a formulation.

Fatty acids suitable for use in forming reaction products of the present disclosure may be selected to afford reaction products having a range of HLB values, such as HLB values of about 5 to about 20. The fatty acids may range in size from about $C_4$ to about $C_{30}$, or about $C_4$ to about $C_{20}$, or about $C_6$ to about $C_{18}$, or about $C_8$ to about $C_{24}$. Suitable fatty acids for forming a reaction product according to the disclosure herein may be straight chain or branched, and saturated or unsaturated. Illustrative fatty acids that may be suitable for forming a reaction product of the present disclosure include, for example, butyric acid, valeric acid, caproic acid, enanthic acid, caprylic acid, pelabonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, trioscylic acid, lignoceric acid, pentacosylic acid, cerotic acid, carboceric acid, montanic acid, nonacosylic acid, melissic acid, crotonic acid, cervonic acid, linoleic acid, linolelaidic acid, linolenic acid, arachidonic acid, docosatetraenoic acid, myristoleic acid, palmitoleic acid, sappenic acid, vaccenic acid, paullinic acid, oleic acid, pinolenic acid, stearidonic acid, eleostearic acid, elaidic acid, gondoic acid, gadoleic acid, erucic acid, eicosenoic acid, eicosadiencoic acid, eicosatrienoic acid, eicosatetraenoic acid, docosadienoic acid, nervonic acid, mead acid, adrenic acid, the like, and any combination thereof. Lauric acid or a blend of lauric acid and myristic acid may be one example of a suitable acid. Any branched variant of the foregoing fatty acids may also be suitably used to form a reaction product of the present disclosure.

Methods of the present disclosure may further comprise inducing foam formation in the aqueous phase after obtaining the reaction product therein, optionally after further combining the reaction product with water and/or adding additional components. Inducing foam formation of the aqueous phase may take place by agitating the aqueous phase in the presence of a gas, such as through stirring or blending in the presence of the gas, bubbling gas through the aqueous phase, or any combination thereof. The neutral surfactant and/or zwitterionic surfactant may be present in combination with the reaction product while forming the foam.

Gases suitable for forming a foam in the presence of the reaction products are not believed to be particularly limited. Suitable gases for forming a foam may include, but are not limited to, air, nitrogen, carbon dioxide, helium, natural gas, or any combination thereof. Aerosol propellants may also be used in some instances.

Foams formed according to the disclosure herein may have a foam quality of about 10% or above, or about 20% or above, or about 30% or above, or about 40% or above, or about 50% or above, or about 60% or above, or about 70% or above, or about 80% or above, or about 90% or above. The upper limit of the foam quality may be about 99%, or about 95%, or about 90%, or about 80%, or about 70%, or about 60% or about 50%.

Foamed or foamable formulations of the present disclosure may comprise an aqueous phase comprising an aqueous carrier fluid, which is described in more detail hereinafter. Foamed formulations (foams) are compositions to which a gas has already been introduced and foam bubbles have formed. That is, foamed formulations may comprise a gas, and an aqueous fluid comprising a composition described herein admixed together with the gas as a plurality of bubbles. Foamable formulations, in contrast, are compositions suitable for forming a foam once a gas has been introduced thereto, but which have not yet formed foam bubbles.

In addition to the reaction products of the present disclosure, foamed or foamable formulations may further comprise one or more additional surfactants, which may be cationic, anionic, zwitterionic, neutral, or any combination thereof. Foamed or foamable formulations may also contain additional components found in soaps and other personal care products, examples of which will be familiar to persons having ordinary skill in the art. Additional disclosure directed to industrial and consumer products, including personal care products and foamed variants thereof, in which the compositions described herein may be present are discussed in further detail below.

Reaction products may be provided, sourced, mixed, or stored in solid form or in liquid form. Liquid forms may be disposed in a suitable fluid phase, such as an aqueous phase, which may be emulsified or non-emulsified depending on particular formulations and intended applications. In addition, the aqueous phase may be foamed in some instances. As used herein, the terms "fluid" and "fluid phase" refer to both liquids and gels, including solutions, emulsions and suspensions of the reaction products, including foams, unless otherwise indicated. Compositions including a reaction product of the present disclosure may comprise an aqueous carrier fluid. Suitable aqueous carrier fluids may include, for example, fresh water, acidified water, seawater, brine (i.e., a saturated salt solution), or an aqueous salt solution (i.e., a non-saturated salt solution). Water-miscible organic co-solvents such as ethanol or ethylene glycol, for example, may be present in combination with an aqueous carrier fluid, in some embodiments. Suitable aqueous carrier fluids may be present while forming the reaction products, or an aqueous carrier fluid may be introduced to the reaction products following their formation.

Subterranean Treatment Operations

Reaction products of the present disclosure, including those formed from maltodextrin, other dextrin compounds, or dextran may be formulated as a subterranean treatment fluid. Treatment fluids may be used in a variety of subterranean treatment operations to facilitate or promote a desired outcome within the subterranean formation. As used herein, the term "treatment fluid" refers to any fluid used in a subterranean treatment operation in conjunction with achieving a desired function and/or for a desired purpose. Unless otherwise specified, use of the term "treatment fluid" does not imply any particular action by the treatment fluid or a component thereof. Illustrative treatment operations that may be facilitated through use of the reaction products of the present disclosure include, without limitation, drilling operations, stimulation operations, production operations, remediation operations, sand control operations, and the like, which may include, for example, fracturing operations, gravel packing operations, acidizing operations, descaling operations, consolidation operations, workover operations, cleanup operations, diversion operations, and the like. Any of these treatment operations may feature emulsification, de-emulsification, a change in surface wetting characteristics downhole, or any combination thereof.

As used herein, the term "drilling operation" refers to the process of forming a wellbore in a subterranean formation. As used herein, the term "drilling fluid" refers to a fluid used in drilling a wellbore.

As used herein, the term "stimulation operation" refers to an activity conducted within a wellbore to increase production therefrom. As used herein, the term "stimulation fluid" refers to a fluid used downhole during a stimulation activity to increase production of a hydrocarbon resource from the subterranean formation. In some instances, stimulation fluids may include a fracturing fluid or an acidizing fluid.

As used herein, the terms "clean-up operation" or "damage control operation" refer to any operation for removing extraneous material from a wellbore to increase production. As used herein, the terms "clean-up fluid" or "damage control fluid" refer to a fluid used for removing an unwanted material from a wellbore that otherwise blocks flow of a desired fluid therethrough. In one example, a clean-up fluid can be an acidified fluid for removing material formed by one or more perforation treatments. In another example, a clean-up fluid can be used to remove a filter cake upon the wellbore walls. For example, a reaction product of the present disclosure may promote liberation of a hydrocarbon resource from a subterranean formation to promote wellbore cleanup by changing surface wetting characteristics. In another embodiment, treatment fluids comprising a reaction product of the present disclosure may be introduced to a subterranean formation in emulsified form and undergo a subsequent break (de-emulsification) therein to promote a desired action within the subterranean formation. In still other embodiments, the treatment fluids may promote de-emulsification of a fluid downhole, such as an emulsified hydrocarbon resource.

As used herein, the term "fracturing operation" refers to a high pressure operation that creates or extends a plurality of flow channels within a subterranean formation. As used herein, the term "fracturing fluid" refers to a viscosified fluid used in conjunction with a fracturing operation. A plurality of proppant particulates may be present in a fracturing fluid to maintain the flow channels created or extended in the fracturing operation in an open state.

As used herein, the term "remediation operation" refers to any operation designed to maintain, increase, or restore a specific rate of production from a wellbore, which may include stimulation operations or clean-up operations. As used herein, the term "remediation fluid" refers to any fluid used in conjunction with a remediation operation.

As used herein, the term "acidizing operation" refers to any operation designed to remove an acid-soluble material from a wellbore, such as an acid-soluble material that comprises at least a portion of the subterranean formation. As used herein, the term "acidizing fluid" refers to a fluid used during an acidizing operation. Mineral acids, such as hydrochloric acid or hydrobromic acid, or organic acids may be present in compositions utilized for acidizing a carbonate formation, whereas hydrofluoric acid may be present in compositions utilized for acidizing a siliceous formation.

As used herein, the term "spotting fluid" refers to a fluid designed for localized treatment of a subterranean formation. In one example, a spotting fluid can include a lost circulation material for treatment of a specific section of the wellbore, such as to seal off fractures in the wellbore and prevent sag. In another example, a spotting fluid can include a water control material or material designed to free a stuck piece of drilling or extraction equipment.

As used herein, the term "completion fluid" refers to a fluid used during the completion phase of a wellbore, including cementing compositions and cementing fluids.

As used herein, the term "cementing fluid" refers to a fluid used during cementing operations within a wellbore of a well.

Reaction products of the present disclosure may also be used in conjunction with enhanced oil recovery (EOR) operations. When used in conjunction with EOR operations, the reaction products of the present disclosure may change surface wetting within a subterranean formation to promote recovery of a hydrocarbon resource therefrom.

In any of the foregoing treatment operations, the treatment fluid may be foamed. Foamed fracturing fluids, for example, may be advantageous compared to viscosified treatment fluids for delivery of proppant particulates to a location in a wellbore. When foamed, treatment fluids may have a foam quality ranging from about 1% to about 99%.

Reaction products of the present disclosure may be present in any of the treatment fluids discussed above. Treatment fluids of the present disclosure may feature a concentration of the reaction product of about 0.1 gallons per thousand gallons (gpt) to about 10 gpt, or about 0.1 gpt to about 1 gpt, or about 0.2 gpt to about 0.5 gpt. These concentrations correspond to volume/volume percentages ranging from about 0.01% to about 1%, or from about 0.01% to about 0.1%, or from 0.02% to about 0.05%. The chosen concentration may vary depending upon the particular requirements for a given treatment operation and/or the specific subterranean conditions that are encountered downhole. In some examples, the reaction product may be present in a concentration effective to lower a surface tension for a neutral surfactant and/or zwitterionic surfactant also present in the treatment fluid.

Treatment fluids containing the reaction products of the present disclosure may optionally further comprise any number of additives that may used in the oilfield services industry. Illustrative additives that may be present in a treatment fluid in combination with the reaction products of the present disclosure include, for example, surfactants, viscosifiers, gelling agents, gel stabilizers, antioxidants, polymer degradation prevention additives, relative permeability modifiers, scale inhibitors, corrosion inhibitors, chelating agents, foaming agents, defoaming agents, antifoaming agents, emulsifying agents, de-emulsifying agents, iron control agents, proppants or other particulates, particulate diverters, salts, acids, fluid loss control additives, gas, catalysts, other clay control agents, dispersants, flocculants, scavengers (e.g., $H_2S$ scavengers, $CO_2$ scavengers or $O_2$ scavengers), lubricants, breakers, friction reducers, bridging agents, weighting agents, solubilizers, pH control agents (e.g., buffers), hydrate inhibitors, consolidating agents, bactericides, catalysts, the like, and any combination thereof. Suitable examples of these additives will be familiar to one having ordinary skill in the art.

Other Products

The compositions of the present disclosure comprising a reaction product of a dextrin compound, a dextran, or any combination thereof with a fatty acid may be formulated in a wide range of industrial or consumer products in which surfactants may be used. Personal care products may represent a beneficial class of products in which the compositions of the present disclosure may be present, given the relative benign nature of the biomolecules present in the compositions disclosed herein. Illustrative industrial and consumer products in which the compositions may be present are provided further below.

Adjuvants are compositions that are used in combination with an active substance to increase the efficacy or potency of the active substance. In non-limiting examples, the active substance may be a pharmaceutical compound, a personal care compound, or an agricultural compound.

The compositions of the present disclosure (e.g., a reaction product of a dextrin compound or a dextran and a fatty acid, as specified above, in combination with a neutral surfactant or a zwitterionic surfactant) may be present in adjuvant compositions in which surfactants of various types may be used. The compositions of the disclosure herein may replace a surfactant used in an adjuvant composition or be used in combination with a surfactant already present in an adjuvant composition. Within an adjuvant composition, the compositions may be present in an amount of about 0.01 wt. % to about 20 wt. % of the adjuvant composition as a whole, or about 0.1 wt. % to about 10 wt. %, or about 1 wt. % to about 15 wt. %, or about 5 wt. % to about 20 wt. %.

An active compound may be present in the adjuvant compositions, or an adjuvant composition may be administered separately from an active compound. When administered separately, the adjuvant compositions may be administered before or after the active compound.

Examples of suitable additional components that may be present in adjuvant compositions containing a reaction product of the present disclosure include, but are not limited to, other surfactants, anti-foam compounds, particulates, metal oxides (e.g., silica, alumina, titania, zirconia, and the like), electrolytes, salts, organic solvents, wetting agents, dispersants, emulsifying agents, de-emulsifying agents, penetrants, preservatives, colorants, acids, bases, buffers, chelating agents, viscosifiers, thixotropic agents, stabilizers, film-forming agents, plasticizers, preservatives, antioxidants, and the like, including any combination thereof. Other surfactants that may be present in the adjuvant compositions are not particularly limited and may include any one or a combination of cationic, anionic, neutral or zwitterionic surfactants.

Foaming agents are compositions that are a stabilized dispersion of a large volume of gas in the form of bubbles of varying sizes in a relatively small volume of liquid, or compositions that may form a foam upon suitable introduction of gas thereto (foamable formulations).

The compositions of the present disclosure (e.g., a reaction product of a dextrin compound or a dextran and a fatty acid, as specified above, in combination with a neutral surfactant or a zwitterionic surfactant, including the combination of a neutral surfactant and a zwitterionic surfactant in the case of forming a foam) may be present in foaming agents in which surfactants of various types may be used. The compositions of the disclosure herein may replace a surfactant used in a foaming agent or be used in combination with a surfactant already present in a foaming agent. Within a foaming agent, the compositions may be present in an amount of about 0.01 wt. % to about 20 wt. % of the foaming agent as a whole, or about 0.1 wt. % to about 10 wt. %, or about 1 wt. % to about 15 wt. %, or about 5 wt. % to about 20 wt. %.

Foaming agents may contain any combination of cationic surfactants, anionic surfactants, zwitterionic surfactants, or neutral surfactants. The compositions disclosed herein may be present in a foaming agent in combination with any of cationic surfactants, anionic surfactants, zwitterionic surfactants, neutral surfactants or any two or more of these surfactants. Alternately, the compositions disclosed herein may replace all or a portion of any one or more of these surfactants in a foaming agent. For example, the compositions of the present disclosure may replace anionic surfactants used in combination with zwitterionic surfactants in a foaming agent. That is, the compositions may be present in a foaming agent in combination with one or more zwitterionic surfactants. The compositions may replace a sulfosuccinate surfactant or be used in combination with a sulfosuccinate surfactant in some foaming agent embodiments, for example.

Examples of suitable additional components that may be present in foaming agents containing a reaction product of the present disclosure include, but are not limited to, other surfactants, amines (any one or a combination of primary amines, secondary amines, tertiary amines, diethanolamine, triethanolamine, ethoxylated amines and amidoamines), foam boosters such as amine oxides, solvents, water, salts, skin conditioners (e.g., ethylhexylglycerin, hydroxyethylurea, urea, panthenol, glycerin, isopropyl myristate, propylene glycol, tocopheryl acetate, and polyquaternium-11), moisturizers, liquefied gases, supercritical gases, acids, bases, salts, buffers, chelating agents, and the like, including any combination thereof. Suitable examples of these additional components will be familiar to one having ordinary skill in the art. Other surfactants that may be present in the foaming agents are not particularly limited and may include any one or a combination of cationic, anionic, neutral or zwitterionic surfactants.

Hard surface cleaners are compositions that may be used to remove various substances from surfaces like glass, metals, plastics, stone, concrete, and the like. Hard surfaces that may be cleaned with hard surface cleaners include, for example, windows, countertops, appliances, floors, driveways, toilets, showers and bathtubs, sinks, and the like. Substances removable from these types of hard surfaces and others span a wide range and include, but are not limited to, dirt, grease, soap scum, limescale and similar hard water deposits, and the like.

The compositions of the present disclosure (e.g., a reaction product of a dextrin compound or a dextran and a fatty acid, as specified above, in combination with a neutral surfactant or a zwitterionic surfactant) may be present in hard surface cleaners in which surfactants of various types may be used. The compositions of the disclosure herein may replace a surfactant used in a hard surface cleaner or be used in combination with a surfactant already present in a hard surface cleaner. Within a hard surface cleaner, the compositions may be present in an amount of about 0.01 wt. % to about 20 wt. % of the hard surface cleaner as a whole, or about 0.1 wt. % to about 10 wt. %, or about 1 wt. % to about 15 wt. %, or about 5 wt. % to about 20 wt. %.

Examples of suitable additional components that may be present in hard surface cleaners containing a reaction product of the present disclosure include, but are not limited to, other surfactants, foaming compounds, anti-foam compounds, salts such as alkali metal carbonates, organic solvents such as glycols or glycol ethers, wetting agents, dispersants, emulsifying agents, de-emulsifying agents, colorants, acids, bases, buffers, chelating agents, anti-streaking agents, alkanolamines, and the like, including any combination thereof Other surfactants that may be present in the hard surface cleaners are not particularly limited and may be any one or a combination of cationic, anionic, neutral or zwitterionic surfactants.

Skin creams and lotions are compositions that may moisturize or otherwise improve the appearance of skin. Skin creams and lotions are inclusive of gels formulation for application to the skin, which may have a higher viscosity than creams or lotions.

The compositions of the present disclosure (e.g., a reaction product of a dextrin compound or a dextran and a fatty acid, as specified above, in combination with a neutral surfactant or a zwitterionic surfactant) may be present in skin creams and lotions in which surfactants may be used. The compositions may replace a surfactant used in a skin cream or lotion or be used in combination with a surfactant already present in a skin cream or lotion. Within a skin cream or lotion, the compositions may be present in an amount of about 0.01 wt. % to about 20 wt. % of the skin cream or lotion as a whole, or about 0.1 wt. % to about 10 wt. %, or about 1 wt. % to about 15 wt. %, or about 5 wt. % to about 20 wt. %.

Examples of suitable additional components that may be present in skin creams or lotions disclosed herein include, but are not limited to, other surfactants, emulsifers, essential oils, waxes, fats, solvents, viscosifying agents, mono-alcohols, diols, polyols, diol and polyol ethers, milk proteins, emollients, humectants, skin conditioners, preservatives, acids, bases, buffers, chelating agents, thickeners, vitamins, lubricants, wrinkle reducers, moisturizers, radical inhibitors and other antioxidants, Vitamin A, Vitamin E, ceramides, fatty acids, fatty esters, fatty alcohols, hyaluronic acid, sodium pyroglutamic acid, glycerin, aloe vera, fragrances, colorants, preservatives, sunscreens, and the like, including any combination thereof. Other surfactants that may be present in the skin creams and lotions are not particularly limited and may be any one or a combination of cationic, anionic, neutral or zwitterionic surfactants. The reaction products may replace at least a portion of one or more existing surfactants in a skin cream or lotion or supplement a quantity of one or more existing surfactants in a skin cream or lotion.

Body washes and shampoos are cleansing compositions formulated for application to the skin or hair. Liquid soaps for more generalized personal cleansing are similar in composition to some body washes and shampoos and may be formulated with many of the same components.

The compositions of the present disclosure (e.g., a reaction product of a dextrin compound or a dextran and a fatty acid, as specified above, in combination with a neutral surfactant or a zwitterionic surfactant) may be present in body washes, shampoos and liquid soaps in which surfactants may be used. The compositions of the disclosure herein may replace a surfactant used in a body wash, shampoo, or liquid soap or be used in combination with a surfactant already present in a body wash, shampoo or liquid soap. Within a body wash, shampoo, or liquid soap, the compositions may be present in an amount of about 0.01 wt. % to about 20 wt. % of the body wash, shampoo, or liquid soap as a whole, or about 0.1 wt. % to about 10 wt. %, or about 1 wt. % to about 15 wt. %, or about 5 wt. % to about 20 wt. %.

Examples of suitable additional components that may be present in body washes, shampoos, or liquid soaps disclosed herein include, but are not limited to, other surfactants, conditioners, amidoamines, fragrances, colorants, essential oils, foaming agents, humectants, fatty acids, fatty esters, fatty alcohols, waxes, biocides, soaps, preservatives, acids, bases, buffers, chelating agents, thickeners, vitamins, pearlizing agents, viscosifying agents, moisturizers, antioxidants, sunscreens, and the like, including any combination thereof. Illustrative examples of body washes, shampoos, and liquid soaps may comprise water, an effective amount of the compositions, optionally in further combination with another surfactant, 0-4% pearlizing agent, 0-1% suspension aids, 0-2% fragrance, 0-0.25% chelating agent, 0-1% preservatives, 0-2% colorant and 0-25% conditioner. Other surfactants that may be present in the body washes, shampoos, and liquid soaps are not particularly limited and may be any one or a combination of cationic, anionic, neutral or zwitterionic surfactants.

Sunscreens are substances that may be applied to the skin to afford protection from the sun. Sunscreens may be formulated as creams or with a suitable wax base in "stick" format for application to the skin.

The compositions of the present disclosure (e.g., a reaction product of a dextrin or dextran and a fatty acid, as specified above, in combination with a neutral surfactant or a zwitterionic surfactant) may be present in sunscreens in which surfactants may be used. The compositions of the disclosure herein may replace a surfactant used in a sunscreen or be used in combination with a surfactant already present in a sunscreen. Within a sunscreen, the compositions may be present in an amount of about 0.01 wt. % to about 20 wt. % of the sunscreen as a whole, or about 0.1 wt. % to about 10 wt. %, or about 1 wt. % to about 15 wt. %, or about 5 wt. % to about 20 wt. %.

Examples of suitable additional components that may be present in sunscreens include, but are not limited to, other surfactants, conditioners, titanium dioxide, zinc oxide, organic UV absorbers, film forming agents, solvents, aerosol propellants, waxes, fats, oils, moisturizers, fragrances, colorants, essential oils, fatty acids, fatty esters, fatty alcohols, preservatives, acids, bases, buffers, chelating agents, thickeners, insect repellents, skin conditioners, and the like, including any combination thereof. Other surfactants that may be present in the sunscreens are not particularly limited and may be any one or a combination of cationic, anionic, neutral or zwitterionic surfactants.

Organic UV absorbers that may be present in a sunscreen in combination with the compositions include, but are not limited to, para-aminobenzoic acid, avobenzone, cinoxate, dioxybenzone, homosalate, menthyl anthranilate, octyl salicylate, oxybenzone, padimate O, phenylbenzimidazole sulfonic acid, sulisobenzone, trolamine salicylate, diethanolamine methoxycinnamate, digalloy trioleate, ethyl dihydroxypropyl PABA, glyceryl aminobenzoate, lawsone with dihydroxyacetone, red petrolatum, ethylhexyl triazone, dioctyl butamido triazone, benzylidene malonate polysiloxane, terephthalylidene dicamphor sulfonic acid, disodium phenyl dibenzimidazole tetrasulfonate, diethylamino hydroxybenzoyl hexyl benzoate, bis diethylamino hydroxybenzoyl benzoate, bis benzoxazoylphenyl ethylhexylimino triazine, drometrizole trisiloxane, methylene bis-benzotriazolyl tetramethylbutylphenol, and bis-ethylhexyloxyphenol methoxyphenyltriazine, 4-methylbenzylidenecamphor, isopentyl 4-methoxycinnamate, phenylbenzimidazole sulfonate, 2-hydroxy-4-methoxy benzophenone-5-sulfonate, 4-(2-beta-glucopyrano-siloxy)propoxy-2-hydroxybenzophenone, and bis-sodium phenylene-1,4-bis(2-benzimidazyl)-3,3'-5,5'-tetrasulfonate, 2-ethylhexyl-p-methoxycinnamate, 4-tert-4'-methoxydibenzoylmethane, octocrylene, 2,4-bis-[{4-(2-ethythexyloxy)-2-hydroxy}-phenyl]-6-(4-methoxyphenyl)-1,3,5-triazine, methylene bis-benzotriazolyl tetrarnethyl butylphenol, 2,4,6-tris-[4-(2-ethylhexyloxycarbonyl)anilino]-1,3,5-triazine, diethylamino hydroxybenzoyl hexyl benzoate, oxybenzone, and dihydroxy dimethoxy benzophenone, and mixtures thereof.

Still other organic UV absorbers that may be suitable for inclusion in a sunscreen include, but are not limited to, bis-resorcinyl triazines; benzimidazole derivatives; 4-methylbenzylidene camphor; benzoyl piperazine derivatives; benzoxazole derivatives; diarylbutadiene derivatives; phenyl benzotriazole derivatives; benzylidene malonates; TEA-salicylate; imidazoline derivatives; naphthalates; merocyanine derivatives; aminobenzophenone derivatives; dibenzoylmethane derivatives; 3,3-diphenylacrylate derivatives; camphor derivatives; salicylate derivatives; anthranilate derivatives; and benzalmalonate derivatives.

In addition to formulations that are sunscreens alone, the compositions of the present disclosure may be present in sunscreens that are incorporated into other products such as lotions, cologne, cosmetics, body washes and shampoos, and the like.

Hair gels and hair sprays are formulations that may be used for holding one's hair in place, or optionally to provide detangling of one's hair. Hair sprays are aerosolized formations, whereas gels are high-viscosity fluids and may be applied by hand.

The compositions of the present disclosure (e.g., a reaction product of a dextrin or dextran and a fatty acid, as specified above, in combination with a neutral surfactant or a zwitterionic surfactant) may be present in hair sprays and hair gels in which surfactants may be used. The compositions of the disclosure herein may replace a surfactant used in a hair spray or hair gel or be used in combination with a surfactant already present in a hair spray or hair gel. Within a hair spray or hair gel, the compositions may be present in an amount of about 0.01 wt. % to about 20 wt. % of the hair gel or hair spray as a whole, or about 0.1 wt. % to about 10 wt. %, or about 1 wt. % to about 15 wt. %, or about 5 wt. % to about 20 wt. %.

Examples of suitable additional components that may be present in hair sprays or hair gels include, but are not limited to, other surfactants, cellulose-based biopolymers, water-soluble polymers, polyalkylene glycols, polyalkylene glycol esters, conditioning agents, emollients, humectants, emulsifiers, opacifying agents, thickening agents, foam stabilizers, viscosity builders, sequestrates, antioxidants, antidandruff agents, suspending agents, proteins, fragrances, sunscreens, botanical extracts, essential oils, fatty acids, fatty esters, fatty alcohols, preservatives, acids, bases, buffers, chelating agents, thickeners, vitamins, waxes, oils, aerosol propellants, polyvinylpyrrolidone, polyvinyl acetate, vinyl acetate-crotonic acid copolymers, acrylic acid copolymers, plasticizers, alcohols, and the like, including any combination thereof. Other surfactants that may be present in the hair sprays and hair gels are not particularly limited and may be any one or a combination of cationic, anionic, neutral or zwitterionic surfactants.

One or more examples of a hair spray or hair gel may comprise a composition of the present disclosure and one or more of cetearyl alcohol, behentrimonium chloride, cyclopentasiloxane, dimethicone, ethylhexyl isononanoate, behenyl alcohol, meadowfoam seed oil, cyclohexasiloxane, olive fruit oil, prunus amygdalus dulcis, stearamidopropyl dimethylamine, behentrimonium methosulfate, amodimethicone, panthenol, glycol stearate, ceteth-2, hydroxyethylcellulose, phenoxyethanol, methylparaben, propylparaben, citric acid, mica, titanium dioxide, iron oxide, fragrance, or any combination thereof.

One or more examples of a hair spray or hair gel may comprise a composition of the present disclosure and one or more of cyclomethicone, jojoba ester, dimethicone copolyol, nonfat dry milk, soy protein, stearic acid, capric/caprylic stearic triglyceride, jojoba oil, hybrid sunflower oil, cetearyl alcohol, glyceryl stearate, PEG-40 stearate, aloe vera gel, acrylates/$C_{10-30}$ alkyl acrylate crosspolymer, propylene glycol, tocopheryl acetate, methylparaben, propylparaben, fragrance, or any combination thereof.

Cosmetics are formulations that may be used for altering or improving one's physical appearance. Illustrative cosmetics include, but are not limited to, lipstick, blush, mascara, foundation, eyeliner, and the like. Forms of cosmetics may include, for example, emulsions, creams, gels, dispersions, sticks, and the like. Suitable emulsions within cosmetics may include oil-in-water or water-in-oil emulsions.

The compositions of the present disclosure (e.g., a reaction product of a dextrin or dextran and a fatty acid, as specified above, in combination with a neutral surfactant or a zwitterionic surfactant) may be present in various types of cosmetics in which surfactants may be used. The compositions of the disclosure herein may replace a surfactant used in cosmetic or be used in combination with a surfactant already present in a cosmetic. Within a cosmetic, the compositions may be present in an amount of about 0.01 wt. % to about 20 wt. % of the cosmetic as a whole, or about 0.1 wt. % to about 10 wt. %, or about 1 wt. % to about 15 wt. %, or about 5 wt. % to about 20 wt. %.

Examples of suitable additional components that may be present in cosmetics include, but are not limited to, other surfactants, perfumes, preservatives, coloring materials, UV absorbers, moisture-retaining agents, emulsifiers, gelling agents, oils, thickening agents, foam stabilizers, viscosity builders, preservatives, sequestrates, antioxidants, suspending agents, proteins, fragrances, sunscreens, botanical extracts, essential oils, fats (e.g., shea butter, mango seed butter, and cacao seed butter), fatty acids, fatty esters, fatty alcohols, biocides, soaps, preservatives, acids, bases, buffers, chelating agents, thickeners, vitamins, waxes (e.g., myristyl myristate, *Camellia sinensis* leaf extract, jojoba, sunflower seed, carnauba wax, candelilla wax, and beeswax), and the like, including any combination thereof. Some examples of components that may be present in cosmetics may include, for example, higher fatty alcohols such as cetyl alcohol, stearyl alcohol and behenyl alcohol; higher fatty acid including caprylic/capric triglyceride, lauric acid, myristic acid, palmitic acid and stearic acid; hydrocarbons including ceresin; natural oils including meadowfoam seed oil, sunflower seed oil, macadamia seed oil, green tea seed oil, ginger oil, ginseng oil, coconut oil, olive oil and camellia oil; esters including phytosteryl/octyldodecyl lauroyl glutamate, isostearyl isostearate, methylheptyl isostearate, dicaprylyl carbonate and isopropyl palmitate; ethers including dicaprylyl ether; silicone oils including dimethicone, cyclopentasiloxane, cyclohexasiloxane, phenyltrimethicone, trisiloxane and methyltrimethicone; and hydrocarbons including squalane. Other surfactants that may be present in the cosmetics are not particularly limited and may be any one or a combination of cationic, anionic, neutral or zwitterionic surfactants. Cosmetics of the present disclosure may be formulated in any suitable form including, sticks, creams, powders, gels, and the like.

Deodorants and antiperspirants are formulations that may be utilized for controlling body odor. Deodorants and antiperspirants of the present disclosure may be formulated in stick form, gel form, powder form or aerosolizable form.

The compositions of the present disclosure (e.g., a reaction product of a dextrin or dextran and a fatty acid, as specified above, in combination with a neutral surfactant or a zwitterionic surfactant) may be present in deodorants and antiperspirants in which surfactants may be used. The compositions of the disclosure herein may replace a surfactant used in a deodorant or antiperspirant or be used in combination with a surfactant already present in a deodorant or antiperspirant. Within a deodorant or antiperspirant, the compositions may be present in an amount of about 0.01 wt. % to about 20 wt. % of the deodorant or antiperspirant as a whole, or about 0.1 wt. % to about 10 wt. %, or about 1 wt. % to about 15 wt. %, or about 5 wt. % to about 20 wt. %.

Examples of suitable additional components that may be present in deodorants or antiperspirants disclosed herein include, but are not limited to, other surfactants, aluminum salts (e.g., alum, aluminum chloride, aluminum chlorohydrate, aluminum-zirconium compounds, aluminum-zirconium tetrachlorohydrex gly, and aluminum-zirconium tetrachlorohydrex gly), anti-bacterial agents, parabens, alcohols, propylene glycol, hexamethylenetetramine, acids, bases, buffers, chelating agents, perfumes, preservatives, coloring materials, moisture-absorbing agents (dessicants), emulsifiers, gelling agents, oils, thickening agents, foam stabilizers, viscosity builders, sequestrates, antioxidants, suspending agents, fragrances, essential oils, fats, fatty acids, fatty esters, fatty alcohols, waxes, and the like, including any combination thereof. Other surfactants that may be present in the deodorants and antiperspirants are not particularly limited and may be any one or a combination of cationic, anionic, neutral or zwitterionic surfactants. Deodorants and antiperspirants of the present disclosure may be formulated in any suitable form including, sticks, creams, powders, gels, and the like.

The compositions of the present disclosure comprising a reaction product of a dextrin compound, a dextran, or any combination thereof with a fatty acid may also find exemplary uses and formulations outside the personal care space as well. In addition to the oilfield applications described above, the compositions of the present disclosure may be incorporated in applications in which metal sequestration from a fluid is needed, such as within froth floatation processes. Froth floatation processes may be conducted in various instances, such as mining runoff or waterwater treatment. In such applications, the compositions of the present disclosure may replace a surfactant used in froth floatation or be used in combination with a surfactant already present in froth floatation process. Within a given froth floatation process, the compositions may be present in an amount of about 0.01 wt. % to about 20 wt. % of a froth floatation fluid as a whole, or about 0.1 wt. % to about 10 wt. %, or about 1 wt. % to about 15 wt. %, or about 5 wt. % to about 20 wt. %.

In some examples, the compositions of the present disclosure may be utilized in roughers and cleaner circuits to promote clay dispersion, water conditioning, additive enhancement and/or emulsification of metal suppressants such as Mn and Fe. Any conventional frothing agent may be utilized in combination with the compositions disclosed herein. Suitable frothing agents and details concerning frothing agents will be familiar to one having ordinary skill in the art.

Embodiments disclosed herein include:

A. Compositions comprising a saccharide polymer reaction product with a fatty acid. The compositions comprise: a reaction product of a saccharide polymer and a fatty acid obtained in the presence of water, a hydroxide base and a neutral surfactant, the saccharide polymer comprising dextran, a dextrin compound, or any combination thereof.

A1. The composition of A, wherein the saccharide polymer comprises dextran.

A2. The composition of A, wherein the saccharide polymer comprises a dextrin compound.

B. Methods for functionalizing a polysaccharide. The methods comprise: heating a saccharide polymer, a fatty acid, a hydroxide base, and a neutral surfactant in water, the saccharide polymer comprising dextran, a dextrin compound, or any combination thereof; and obtaining a reaction product of the saccharide polymer and the fatty acid in an aqueous phase.

B1. The method of B, wherein the saccharide polymer comprises dextran.

B2. The method of B, wherein the saccharide polymer comprises a dextrin compound.

C. Subterranean treatment methods. The methods comprise: providing a treatment fluid comprising the composition of A, A1 or A2, and introducing the treatment fluid into a subterranean formation.

D. Foamable formulations. The foamable formulations comprise the composition of A, A1, or A2.

D1. Soaps and detergents comprising the foamable formulations of D.

E. Foamed formulations. The foamed formulations comprise: a gas, and an aqueous fluid comprising the composition of A, A1 or A2 admixed together with the gas to form a plurality of bubbles.

F. Methods for forming a foam. The methods comprise: providing an aqueous fluid comprising the composition of A, A1 or A2, and inducing foam formation in the aqueous fluid.

Embodiments A, A1, A2, B, B1, B2, C, D, D1, E and F may have one or more of the following additional elements in any combination.

Element 1: wherein the saccharide polymer comprises a dextrin compound and the dextrin compound comprises a maltodextrin.

Element 2: wherein the maltodextrin has a dextrose equivalent value of about 3 to about 20.

Element 3: wherein the maltodextrin has a dextrose equivalent value of about 4.5 to about 7.0.

Element 4: wherein the maltodextrin has a dextrose equivalent value of about 9.0 to about 12.0.

Element 5: wherein the fatty acid comprises about 4 to about 30 carbon atoms.

Element 6: wherein the fatty acid comprises at least one fatty acid selected from the group consisting of butyric acid, valeric acid, caproic acid, enanthic acid, caprylic acid, pelabonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, trioscylic acid, lignoceric acid, pentacosylic acid, cerotic acid, carboceric acid, montanic acid, nonacosylic acid, melissic acid, crotonic acid, cervonic acid, linoleic acid, linolelaidic acid, linolenic acid, arachidonic acid, docosatetraenoic acid, myristoleic acid, palmitoleic acid, sappenic acid, vaccenic acid, paullinic acid, oleic acid, pinolenic acid, stearidonic acid, eleostearic acid, elaidic acid, gondoic acid, gadoleic acid, erucic acid, eicosenoic acid, eicosadiencoic acid, eicosatrienoic acid, eicosatetraenoic acid, docosadienoic acid, nervonic acid, mead acid, adrenic acid, and any combination thereof.

Element 7: wherein the neutral surfactant comprises cocamide diethanolamine.

Element 8: wherein a molar ratio of fatty acid to dextrin in the reaction product is about 0.2 or above on a basis of $moles_{fatty\ acid}:moles_{glucose\ monomers}$.

Element 8A: wherein a molar ratio of fatty acid to dextrin in the reaction product is about 0.05 or above on a basis of $moles_{fatty\ acid}:moles_{glucose\ monomers}$.

Element 9: wherein a molar ratio of fatty acid to dextrin in the reaction product is about 0.35 or above on a basis of $moles_{fatty\ acid}:moles_{glucose\ monomers}$.

Element 10: wherein the treatment fluid is emulsified when introduced into the subterranean formation or becomes emulsified within the subterranean formation.

Element 11: wherein the treatment fluid comprises a water-in-oil emulsion.

Element 12: wherein the treatment fluid comprises an oil-in-water emulsion.

Element 13: wherein the treatment fluid comprises a microemulsion when introduced to the subterranean formation.

Element 14: wherein the treatment fluid promotes enhanced oil recovery within the subterranean formation.

Element 14A: wherein the treatment fluid is foamed.

Element 15: wherein the method further comprises combining the fatty acid, the hydroxide base, and the neutral surfactant in the water to form a mixture, heating the mixture until the fatty acid dissolves and a homogeneous mixture forms, and combining the saccharide polymer with the homogeneous mixture.

Element 15A: wherein the method further comprises agitating the aqueous phase to form a foam.

Element 16: wherein a foamable formulation comprises the composition.

Element 17: wherein the foamable formulation comprises a soap.

Element 18: wherein inducing foam formation comprises agitating the aqueous fluid to introduce gas thereto.

By way of non-limiting example, exemplary combinations applicable to A, A1, A2, B, B1, B2, C, D1, E and F include, but are not limited to: 1, and 2, 3 or 4; 5 or 6, and 2, 3 or 4; 1 and 7; 1, and 8 or 9; 2, 3 or 4, and 5 or 6; 2, 3 or 4, and 7; 2, 3 or 4, and 8 or 9; 5 or 6, and 7; 5 or 6, and 8 or 9; and 7, and 8 or 9. Any of the foregoing may be in further combination with one or more of 10-18.

Additional embodiments disclosed herein include:

A'. Compositions comprising a saccharide polymer reaction product with a fatty acid. The compositions comprise: a neutral surfactant or a reaction product thereof, and a reaction product of a saccharide polymer and a fatty acid, the saccharide polymer comprising a dextran, a dextrin compound, or any combination thereof. The reaction product is present at a concentration effective to lower a surface tension of the neutral surfactant.

A1'. The composition of A', wherein the saccharide polymer comprises dextran.

A2'. The composition of A', wherein the saccharide polymer comprises a dextrin compound, preferably maltodextrin.

B'. Methods for functionalizing a polysaccharide. The methods comprise: heating a saccharide polymer, a fatty acid, and a hydroxide base in water, the saccharide polymer comprising dextran, a dextrin compound, or any combination thereof; obtaining a reaction product of the saccharide polymer and the fatty acid in an aqueous phase; and combining a neutral surfactant or a reaction product thereof with the reaction product of the saccharide polymer and the fatty acid in the aqueous phase.

B1'. The method of B', wherein the saccharide polymer comprises a dextran.

B2'. The method of B', wherein the saccharide polymer comprises a dextrin compound, such as maltodextrin.

C'. Subterranean treatment methods. The methods comprise: providing a treatment fluid comprising the composition of A', A1' or A2', and introducing the treatment fluid into a subterranean formation.

D'. Foamable formulations. The foamable formulations comprise the composition of A', A1', or A2'.

D1'. Soaps and detergents comprising the foamable formulations of D'.

E'. Foamed formulations. The foamed formulations comprise: a gas, and an aqueous fluid the composition of A', A1' or A2' admixed together with the gas to form a plurality of bubbles.

F'. Methods for forming a foam. The methods comprise: providing an aqueous fluid comprising the composition of A', A1' or A2', and inducing foam formation in the aqueous fluid.

G'. Personal care products comprising the reaction product of A', A1' or A2'.

H'. Compositions comprising a neutral surfactant, a hydroxide base, a saccharide polymer, and a fatty acid. The saccharide polymer comprises a dextran, a dextrin compound, or any combination thereof.

Embodiments A', A1', A2', B', B1', B2', C', D', D1', E', F', G' and H' may have one or more of the following additional elements in any combination.

Element 1': wherein the saccharide polymer comprises a dextrin compound and the dextrin compound comprises a maltodextrin.

Element 2': wherein the maltodextrin has a dextrose equivalent value of about 3 to about 20.

Element 3': wherein the maltodextrin has a dextrose equivalent value of about 4.5 to about 7.0.

Element 4': wherein the maltodextrin has a dextrose equivalent value of about 9.0 to about 12.0.

Element 5': wherein the fatty acid comprises about 4 to about 30 carbon atoms.

Element 6': wherein the fatty acid comprises at least one fatty acid selected from the group consisting of butyric acid, valeric acid, caproic acid, enanthic acid, caprylic acid, pelabonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, trioscylic acid, lignoceric acid, pentacosylic acid, cerotic acid, carboceric acid, montanic acid, nonacosylic acid, melissic acid, crotonic acid, cervonic acid, linoleic acid, linolelaidic acid, linolenic acid, arachidonic acid, docosatetraenoic acid, myristoleic acid, palmitoleic acid, sappenic acid, vaccenic acid, paullinic acid, oleic acid, pinolenic acid, stearidonic acid, eleostearic acid, elaidic acid, gondoic acid, gadoleic acid, erucic acid, eicosenoic acid, eicosadiencoic acid, eicosatrienoic acid, eicosatetraenoic acid, docosadienoic acid, nervonic acid, mead acid, adrenic acid, and any combination thereof.

Element 7': wherein the neutral surfactant comprises cocamide diethanolamine or a reaction product thereof, or wherein the neutral surfactant comprises cocamide diethanolamine.

Element 7A': wherein the reaction product is formed in the presence of the neutral surfactant.

Element 8': wherein a molar ratio of fatty acid to dextrin in the reaction product is about 0.2 or above on a basis of moles$_{fatty\ acid}$:moles$_{glucose\ monomers}$.

Element 8A': wherein a molar ratio of fatty acid to dextrin in the reaction product is about 0.05 or above on a basis of moles$_{fatty\ acid}$:moles$_{glucose\ monomers}$.

Element 9': wherein a molar ratio of fatty acid to dextrin in the reaction product is about 0.35 or above on a basis of moles$_{fatty\ acid}$:moles$_{glucose\ monomers}$.

Element 10': wherein the reaction product of the saccharide polymer is obtained in the presence of water and a hydroxide base.

Element 11': wherein the reaction product of the saccharide polymer comprise a fatty ester reaction product.

Element 12': wherein the treatment fluid is emulsified when introduced into the subterranean formation or becomes emulsified within the subterranean formation.

Element 13': wherein the treatment fluid comprises a water-in-oil emulsion.

Element 14': wherein the treatment fluid comprises an oil-in-water emulsion.

Element 15': wherein the treatment fluid comprises a microemulsion when introduced to the subterranean formation.

Element 16': wherein the treatment fluid promotes enhanced oil recovery within the subterranean formation.

Element 16A': wherein the treatment fluid is foamed.

Element 17': wherein the method further comprises combining the fatty acid, the hydroxide base, and the neutral surfactant in the water to form a mixture, heating the mixture until the fatty acid dissolves and a homogeneous mixture forms, and combining the saccharide polymer with the homogeneous mixture.

Element 18A': wherein the method further comprises agitating the aqueous phase to form a foam.

Element 19': wherein a foamable formulation comprises the composition.

Element 20': wherein the foamable formulation comprises a soap.

Element 21': wherein inducing foam formation comprises agitating the aqueous fluid to introduce gas thereto.

By way of non-limiting example, exemplary combinations applicable to A', A1', A2', B', B1', B2', C', D', D1', E', F' and G' include, but are not limited to: 1', and 2', 3' or 4'; 5' or 6', and 2', 3' or 4'; 1' and 7' or 7A'; 1', and 8' or 9'; 2', 3' or 4', and 5' or 6'; 2', 3' or 4', and 7' or 7A'; 2', 3' or 4', and 8' or 9'; 5' or 6', and 7' or 7A'; 5' or 6', and 8' or 9'; and 7' or 7A', and 8' or 9'. Any of the foregoing may be in further combination with one or more of 10'-21'.

To facilitate a better understanding of the disclosure herein, the following examples of various representative embodiments are given. In no way should the following examples be read to limit, or to define, the scope of the invention.

EXAMPLES

Comparative Example 1: Acid-Catalyzed Synthesis of Maltodextrin with Lauric Acid. A solution containing 10 wt. % maltodextrin (MALTRIN M100, DE=9.0-12.0, 30% active solution) and 6.18 wt. % lauric acid was prepared in DMSO. Five drops of phosphoric acid were added, and the reaction mixture was heated at 110° C. for 3 hours. The reaction product was precipitated by adding 3 volumes of isopropyl alcohol, and a white precipitate was collected by decantation and dried. The product was characterized by FTIR and $^1$H NMR. The spectral characterization was consistent with conversion of maltodextrin into a reaction product.

For surface tension measurements (Table 2), the isolated reaction product was redissolved at a concentration of 13.17 wt. % in the presence of 5 wt. % cocamide diethanolamine (CocoDEA) and 6 wt. % sodium dodecylbenzene sulfonate (SDDBS).

Comparative Example 2: Acid Chloride-Based Reaction of Maltodextrin. A solution containing 10 wt. % maltodextrin (MALTRIN M100, DE=9.0-12.0, 30% active solution) and 6.75 wt. % lauroyl chloride was prepared in formamide. A few drops of phosphoric acid were added, and the reaction mixture was heated at 105° C. for 2 hours. The reaction product was precipitated by adding 3 volumes of isopropyl alcohol, and an amber tar-like fluid was obtained. The product was characterized by FTIR and $^1$H NMR. The spectral characterization was consistent with conversion of maltodextrin into a reaction product.

For surface tension measurements (Table 2), the isolated reaction product was redissolved at a concentration of 13.17 wt. % in the presence of 5 wt. % cocamide diethanolamine (CocoDEA) and 6 wt. % sodium dodecylbenzene sulfonate (SDDBS).

Example 1A: General Procedure for Preparation of Reaction Products of Maltodextrin Under Basic Conditions. 296.25 g water, 25.00 g cocamide diethanolamine (CocoDEA), and 10.00 g KOH (45% active solution) were combined. The reaction mixture was mechanically stirred and heated to 65° C. Thereafter, 18.75 g fatty acid and 150.0 g maltodextrin (MALTRIN M100, Grain Processing Corporation, Muscatine, Iowa; DE=9.0-12.0) as a 30% active solution were added to the reaction mixture. Once the maltodextrin dissolved, heating was discontinued and stirring was conducted until the reaction mixture reached room temperature. Reaction products were used without further processing below. Table 1A shows the maltodextrin reaction products synthesized as above and tested in the subsequent examples. Caprylic acid is synonymous with octanoic acid, lauric acid is synonymous with dodecanoic acid, and stearic acid is synonymous with octadecanoic acid.

TABLE 1A

| Sample | Fatty Acid | Molar Ratio Fatty Acid:Maltodextrin (as Glucose Monomer) |
|---|---|---|
| A | Butyric Acid | 0.77 |
| B | Caprylic Acid | 0.47 |
| C | Lauric Acid | 0.34 |
| D | Stearic Acid | 0.24 |

The general synthetic procedure was followed for all but Sample A. For Sample A, 27.5 g KOH (45% active) and 278.75 g water were used, and the other reaction parameters remained the same. The calculated molar ratios assume that the entirety of the maltodextrin has the molecular weight of glucose (180.16 g/mol) less the molecular weight of water (18.02 g/mol)=162.14 g/mol.

Example 1B: Alternative Procedure for Preparation of Reaction Products of Maltodextrin Under Basic Conditions. A solution containing 10 wt. % maltodextrin (MALTRIN M100, DE=9.0-12.0, 30% active solution), 6.18 wt. % lauric acid, and 1.73 wt. % KOH was prepared in water. The reaction mixture was then heated at 65° C. for 30 minutes. The reaction product was precipitated by adding 3 volumes of isopropyl alcohol, and a white precipitate was collected by decantation and dried. The product was characterized by FTIR and $^1$H NMR. The spectral characterization was consistent with conversion of maltodextrin into a reaction product. Other fatty acids may be reacted similarly.

For surface tension measurements (Table 2), the isolated reaction product was redissolved at a concentration of 13.17 wt. % in the presence of 5 wt. % cocamide diethanolamine (CocoDEA) and 6 wt. % sodium dodecylbenzene sulfonate (SDDBS). As shown in Table 2, similar surface tension performance was realized between the reaction products of Example 1A and Comparative Examples 1 and 2.

Example 2: General Procedure for Preparation of Reaction Products of Dextran Under Basic Conditions. Reaction products were formed from dextran in a similar manner to that described above for maltodextrin. The dextran had a molecular weight of 500,000 and an activity level of 9% within a solution thereof. Table 1B shows the dextran reaction products synthesized as above and tested in the subsequent examples. Caprylic acid is synonymous with octanoic acid, lauric acid is synonymous with dodecanoic acid, palmitic acid is synonymous with hexadecanoic acid, and stearic acid is synonymous with octadecanoic acid.

TABLE 1B

| Sample | Fatty Acid | Weight Ratio Fatty Acid:Weight Dextran | Molar Ratio Fatty Acid:Dextran (as Glucose Monomer) |
|---|---|---|---|
| E1 | Caprylic Acid | 1:10 | 0.11 |
| E2 | Caprylic Acid | 1:5 | 0.22 |
| E3 | Caprylic Acid | 1:2 | 0.57 |
| E4 | Caprylic Acid | 1:1 | 1.13 |
| F1 | Lauric Acid | 1:10 | 0.081 |
| F2 | Lauric Acid | 1:5 | 0.16 |
| F3 | Lauric Acid | 1:2 | 0.41 |
| F4 | Lauric Acid | 1:1 | 0.81 |
| G1 | Palmitic Acid | 1:10 | 0.063 |
| G2 | Palmitic Acid | 1:5 | 0.13 |
| G3 | Palmitic Acid | 1:2 | 0.32 |
| G4 | Palmitic Acid | 1:1 | 0.63 |
| H1 | Stearic Acid | 1:10 | 0.057 |
| H2 | Stearic Acid | 1:5 | 0.11 |
| H3 | Stearic Acid | 1:2 | 0.28 |
| H4 | Stearic Acid | 1:1 | 0.57 |

Characterization of Comparative Examples 1 and 2 in Relation to Example 1B. Table 2 summarizes the surface tension values for the reaction products of Comparative Examples 1 and 2 and the reaction product of Example 1B (alternative preparation under basic conditions) at a concentration of 1 gpt (gallons per thousand gallons), in comparison to control samples containing 5 wt. % CocoDEA or 5 wt. % CocoDEA/6 wt. % SDDBS. Surface tension (ST) measurements were made using a Bolin Scientific Tensiometer at room temperature. Intrafacial tension (IFT) measurements were performed using a hook needle syringe to form a drop of oil in water.

TABLE 2

| Entry | Sample | Surface Tension at 1 gpt (dynes/cm) |
|---|---|---|
| 1 | Control (5 wt. % CocoDEA/ 6 wt. % SDDBS) | 31.26 |
| 2 | Control (5 wt. % CocoDEA) | 34.49 |
| 3 | Comparative Example 1 | 31.77 |
| 4 | Comparative Example 2 | 31.48 |
| 5 | Example 1B | 31.51 |

The control samples and comparative/experimental samples contained identical concentrations of CocoDEA or CocoDEA/SDDBS. As shown, the reaction product prepared under basic conditions (Entry 5) afforded similar performance to that obtained under acidic conditions (Entries 3 and 4). In each case, the surface tension was similar to that of the surfactant-only CocoDEA/SDDBS control (Entry 1). The surface tension values decreased by about 10% relative to a CocoDEA-only control (Entry 2). This surprising result is further elaborated upon below.

Emulsion Performance of Dextrin Reaction Products. Each reaction product prepared as above in Example 1A was formulated at 0.5 gpt (gallons per thousand gallons) and 1 gpt and combined with Terero oil or Wolfcamp A Oil. Terero oil is an emulsifying oil, and Wolfcamp A oil is a non-emulsifying oil. The mixture of each oil was then emulsified and the extent of emulsification was followed as a function of time in comparison to a blank. The blank comprised each oil without any additional emulsifiers. Emulsification was performed at room temperature by shaking 50 mL of sample and 50 mL of oil by hand for 60 seconds at a rate of about 2 shakes per second. The emulsions were immediately poured into a graduated cylinder and time-lapse photography was used to record the level of the water layer, the oil layer, and the remaining emulsion layer. For Wolfcamp A oil, the oil layer and the water layer were assumed equal, since the oil layer was difficult to differentiate from the emulsion layer. FIGS. 1A-1D show plots of percent emulsification as a function of time for Terero oil emulsified with Samples A-D, respectively. FIGS. 2A-2D show plots of percent emulsification as a function of time for Wolfcamp A oil emulsified with Samples A-D, respectively.

Both oils were initially emulsified in the presence of the maltodextrin reaction products, but the emulsions broke over time, albeit at different rates. Terero oil usually changed its emulsification behavior only slightly in the presence of the reaction products formed from carboxylic acids having varying chain lengths. With the non-emulsifying Wolfcamp A oil, in contrast, the maltodextrin reaction products sometimes afforded faster emulsion breaking than did the control. The results suggest that the maltodextrin reaction products, particularly the specific fatty acid used for functionalization and the amount of reaction product present, may alter the break properties of the non-emulsifying Wolfcamp oil itself to varying extents. The differing performance may arise from variation of the hydrophilic-lipophilic balance. Moreover, the break properties may differ from that of CocoDEA alone, which afforded a near-complete break of Wolfcamp oil within about 30 minutes at 1 gpt (data not shown).

Fluid Properties of Dextrin Reaction Products. Critical micelle concentration (CMC) measurements and surface tension (ST) measurements were made using a Bolin Scientific Tensiometer at room temperature. FIGS. 3A-3D show plots of surface tension as a function of concentration for Samples A-D, respectively. As shown, Samples B and C reached a CMC at a reaction product concentration of about 0.5 gpt. The surface tension at the CMC was approximately 30 dynes/cm or slightly below. Samples A and D, in contrast, trended toward lower surface tension values, albeit at higher CMCs. As such, the emulsion performance measurements above were performed above the CMC for at least Samples B and C. The surface tension was slightly higher for 0.2 wt. % KCl compared to that obtained with tap water.

The surface tension performance of individual components of the reaction mixture used to produce Sample C were also compared against that of the reaction product itself. Measurements were made at 1 gpt and 2 gpt, as specified in Table 3 below.

TABLE 3

| Entry | Component | ST at 1 gpt (dynes/cm) | ST at 2 gpt (dynes/cm) |
|---|---|---|---|
| 1 | maltodextrin (30% active solution) | 73.03 | 72.85 |
| 2 | maltodextrin (30% active solution), 1.7% KOH (45% active solution) and 6.18% lauric acid (heated as above) | n/d | 77.39 |
| 3 | 10% maltodextrin (30% active solution), 5% CocoDEA neutral surfactant solution (heated as above) | 49.23 | 35.89 |
| 4 | 5% CocoDEA neutral surfactant solution (heated as above) | 34.49 | 31.93 |
| 5 | 5% CocoDEA neutral surfactant solution containing 2% KOH (45% active solution) (heated as above) | 36.73 | 35.00 |
| 6 | 5% CocoDEA neutral surfactant solution containing 2.47% lauric acid (heated as above) | 39.88 | 32.99 |
| 7 | 5% CocoDEA neutral surfactant solution containing 2% KOH (45% active solution) and 3.75% lauric acid (heated as above) | 36.52 | 30.40 |
| 8 | Sample C | 28.84 | 28.59 |

As shown, the maltodextrin itself (Entry 1) afforded a very high surface tension in comparison to Sample C (Entry 8). In the absence of CocoDEA, the surface tension remained very high even when other components used to form the reaction product were present (Entry 2). 5 wt. % CocoDEA afforded a much lower surface tension (Entry 4), which increased in the presence of maltodextrin (Entry 3). When other components used to form the reaction mixture (except maltodextrin) were combined with 5 wt. % CocoDEA, the surface tension increased slightly (Entries 4-7) relative to the reaction product. In contrast, when all reaction components were present together in Sample C (Entry 8), the surface tension was lower than any other tested combination of reaction components. The decreased surface tension realized in the presence of the maltodextrin reaction product is particularly surprising, given that maltodextrin by itself increased the surface tension (Entries 3 and 4).

Tables 4 and 5 show the surface tension performance of Sample C at 1 gpt in water and $CaCl_2$/water, respectively, at various pH values or $CaCl_2$) concentrations. The surface tension of Sample C slightly decreased further at more acidic pH values.

TABLE 4

| pH ($H_2O$) | Surface Tension (dynes/cm) |
|---|---|
| 1 | 25.05 |
| 4 | 27.11 |
| 7 | 28.25 |
| 10 | 28.25 |
| 14 | 28.64 |

TABLE 5

| $CaCl_2$ (wt. %) | Surface Tension (dynes/cm) |
|---|---|
| 0.2 | 28.06 |
| 2 | 29.27 |
| 10 | 27.17 |

Intrafacial tension (IFT) measurements were performed using a hook needle syringe to form a drop of oil in water. The measurements were made using tap water and Wolfcamp A oil and were evaluated after 61 hours of equilibration. Table 6 below summarizes the IFT performance of Sample C.

TABLE 6

| Concentration (gpt) | IFT (dynes/cm) |
|---|---|
| 0.5 | 8.57 |
| 1 | 7.51 |
| 2 | 5.48 |

Emulsion Performance of Dextran Reaction Products. Each reaction product prepared as above was formulated at 1 gpt and combined with East Texas Hutchison oil #2. Each oil mixture was then emulsified, and the extent of emulsification was followed as a function of time in comparison to a blank. The blank comprised the oil without any additional emulsifiers. Emulsification was performed at room temperature by shaking 50 mL of sample and 50 mL of oil by hand for 60 seconds at a rate of about 2 shakes per second. The emulsions were immediately poured into a graduated cylinder and time-lapse photography was used to record the level of the water layer, the oil layer, and the remaining emulsion layer. FIGS. 4A-4D show plots of percent emulsification as a function of time for East Texas Hutchison #2 oil emulsified with Samples E1-E4, F1-F4, G1-G4 and H1-H4, respectively.

Figure 5:
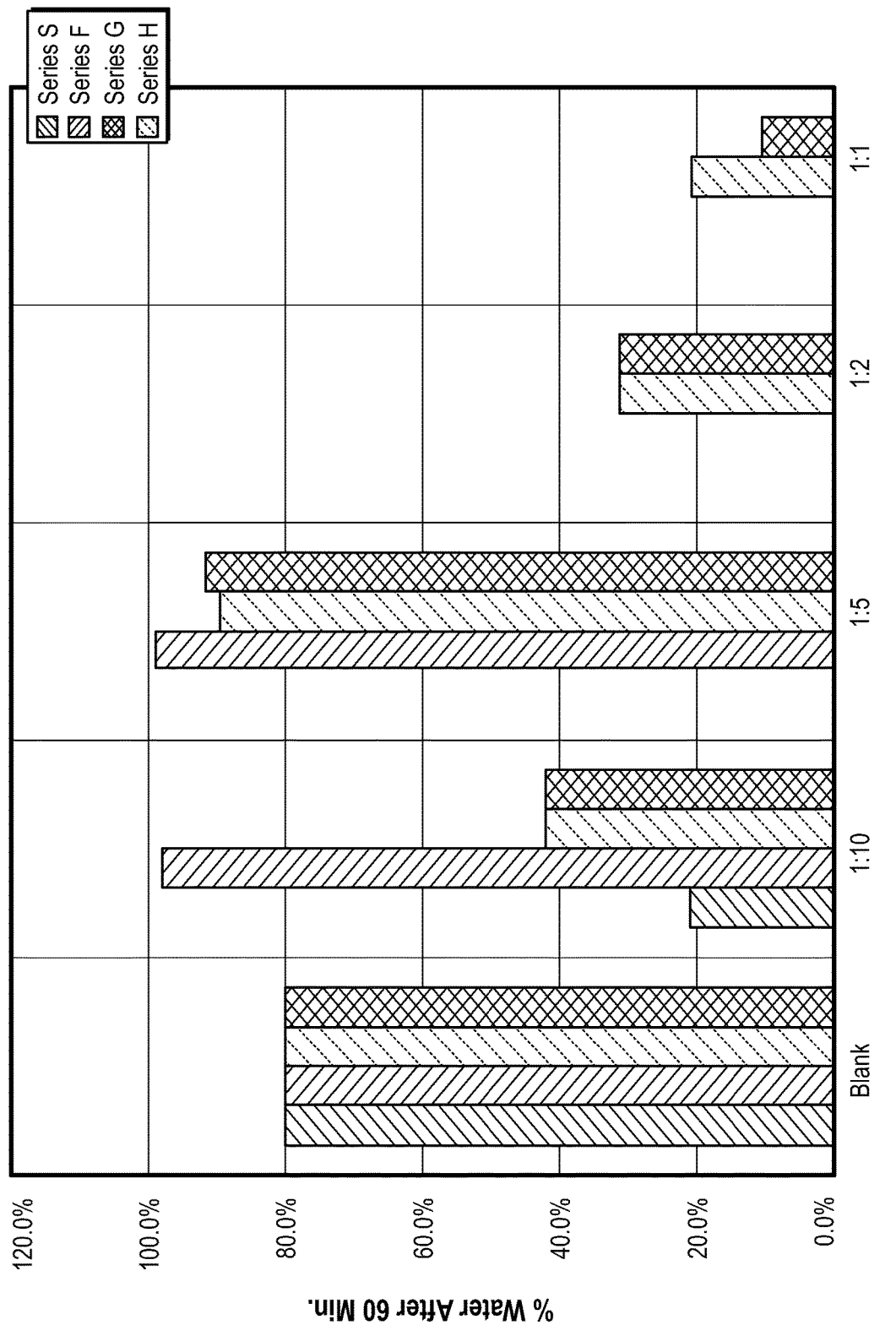
FIG. 5 shows a plot of percent water emulsification at 60 minutes for Samples E1-E4, F1-F4, G1-G4, and H1-H4.

FIG. 5 shows a plot of percentage of de-emulsified water present after 60 minutes for each dextran reaction product at various weight ratios of fatty acid:dextran. As shown, the various dextran reaction products could promote emulsification or de-emulsification depending on the amount of fatty acid that was reacted with a given quantity of dextran. Series E samples (caprylic acid) afforded minimal emulsification. Series F samples (lauric acid) provided strong emulsification at weight ratios of 1:10 and 1:5, but emulsification decreased considerably at lower fatty acid loading. At weight ratios of 1:1 and 1:2 caprylic acid and lauric acid afforded little emulsification, but some degree of emulsification still occurred for palmitic and stearic acid (Series G and Series H samples) at these weight ratios. Overall, the strongest emulsification effects were observed at a weight ratio of 1:5 for all of the fatty acids except for caprylic acid (Series E samples).

Surface Tension of Dextran Reaction Products. The surface tension performance of the dextran reaction products was measured at 1 gpt and 2 gpt, as specified in Table 7 below.

TABLE 7

| Sample | ST at 1 gpt (dynes/cm) | ST at 2 gpt (dynes/cm) |
|---|---|---|
| E1 | 34.61 | 30.25 |
| E2 | 34.07 | 29.15 |
| E3 | 32.39 | 28.87 |
| E4 | 31.95 | 29.00 |
| F1 | 30.49 | 28.75 |
| F2 | 29.93 | 27.93 |
| F3 | 31.34 | 27.65 |
| F4 | 68.20 | 54.71 |
| G1 | 33.82 | 28.25 |
| G2 | 28.77 | 27.46 |
| G3 | 31.51 | 28.53 |
| G4 | 45.76 | 38.04 |
| H1 | 34.66 | 28.75 |
| H2 | 33.06 | 28.27 |
| H3 | 38.07 | 32.13 |
| H4 | 49.97 | 40.98 |

As shown, all of the dextran reaction products were capable of lowering the surface tension of CocoDEA, at least at some concentrations and fatty acid loadings, in a manner similar to that provided by the maltodextrin reaction products described above. At the highest fatty acid loadings (samples F4, G4 and H4), the ability to lower the surface tension decreased considerably. Thus, the surface tension was tunable depending on the molecular weight of the fatty acid and the extent of fatty acid loading.

Example 3: Substitution of CocoDEA with Betaine Surfactant. Sample C' was prepared in the same manner as Sample C above using the procedure of Example 1A and similar reagent proportions, except substituting a betaine (zwitterionic) surfactant (SOPALEX 360 BET) for Coco-DEA and conducting the reaction at 50° C. Table 8 summarizes the surface tension of the reaction product in comparison to the betaine surfactant alone.

TABLE 8

| Sample | ST at 1 gpt (dynes/cm) | ST at 2 gpt (dynes/cm) |
|---|---|---|
| Zwitterionic Surfactant | 71.04 | 64.9 |
| Sample C' | 66.27 | 55.55 |

Substitution of the betaine surfactant for the neutral surfactant CocoDEA afforded high surface tension values at each tested concentration. The betaine surfactant by itself afforded relatively high surface tension values. Surprisingly, the reaction product was operable to decrease the surface tension somewhat in comparison to the betaine surfactant alone.

Example 4: Substitution of CocoDEA with Ethoxylated Alcohol Neutral Surfactant. Sample C" was prepared in the same manner as Sample C above using the procedure of Example 1A and similar reagent proportions, except substituting an ethoxylated alcohol neutral surfactant (Tomadol 1-9) for CocoDEA and conducting the reaction at 50° C. Table 9 summarizes the surface tension of the reaction product in comparison to the ethoxylated alcohol surfactant alone.

TABLE 9

| Sample | ST at 1 gpt (dynes/cm) | ST at 2 gpt (dynes/cm) |
|---|---|---|
| Ethoxylated alcohol surfactant | 46.6 | 39.5 |
| Sample C" | 47.4 | 41.9 |

The ethoxylated alcohol surfactant afforded much higher surface tension values at each tested concentration than did a like concentration of CocoDEA. The reaction product in combination with the ethoxylated alcohol surfactant afforded a similar surface tension to that of the ethoxylated alcohol surfactant alone.

Example 5: Decreased CocoDEA Concentration. Sample C''' was prepared in the same manner as Sample C above using the procedure of Example 1A and similar reagent proportions, except the CocoDEA concentration was lowered to one-fifth the concentration used above (i.e., 1 wt. %). Table 10 summarizes the surface tension of the reaction product in comparison to the reduced-concentration Coco-DEA surfactant solution alone.

TABLE 10

| Sample | ST at 1 gpt (dynes/cm) | ST at 2 gpt (dynes/cm) |
|---|---|---|
| CocoDEA at ⅕ concentration | 71.96 | 67.87 |
| Sample C" | 65.84 | 59.05 |

Lowering the CocoDEA concentration significantly increased the surface tension values. Even though the surface tension was considerably higher than when 5 wt. % CocoDEA was present, the reaction product still decreased the surface tension in comparison to CocoDEA itself.

Foaming Performance of Dextrin Reaction Products. Sample 1C (reaction product of maltodextrin and lauric acid) was processed into a soap formulation having the following composition: 61.1% wt. % deionized water, 20.9 wt. % maltodextrin/lauric acid reaction product (combined as aqueous mixture prepared as above), 7.5 wt. % cocamidopropyl betaine, 0.5 wt. % glycerin, and 10.0 wt. % SOPALTERIC CS (sodium cocoamphohydroxypropylsulfonate, Southern Chemical and Textile). A comparative soap formulation having the following composition was prepared for side-by-side evaluation of foaming performance: 20 wt. % of a 30 wt. % sodium lauryl sulfate solution in water, 5 wt. % cocoamidopropyl betaine, 0.5 wt. % glycerin, 0.8 wt. % NaCl and balance deionized water. The soap formulations contained approximately equivalent amounts of the maltodextrin/lauric acid reaction product and sodium lauryl sulfate.

Foaming performance of the experimental soap formulation in comparison to the comparative soap formulation was assayed using the Hart-DeGeorge Foam Test. In brief, the Hart-DeGeorge Foam Test utilizes a wire screen placed between a funnel and a graduated cylinder. A set volume of a foamed mixture is then introduced into the funnel, and the time required for the wire screen (850 μm mesh size) to be exposed is measured. The liquid level in the graduated cylinder is also measured at various times. Lower density foams are thus characterized by longer times required to expose the wire screen, and lower amounts of liquid collected in the graduated cylinder are indicative of a more stable foam.

To conduct Hart-DeGeorge Foam Tests with the experimental and comparative soap formulations, 1% active solutions of each soap formulation were prepared in separate 200 mL quantities of deionized water (soft water) at 25° C. The solutions were then blended at high speed in a blender for 1 minute. At the completion of blending, the resulting foam was transferred to the funnel. The time required for the wire mesh to be exposed was measured. In addition, the liquid level in the graduated cylinder was recorded at 1, 2, 3, 4, 5 and 14 minutes. Table 11 summarizes the Hart-DeGeorge Foam Test performance of the experimental and comparative soap formulations.

TABLE 11

| | Comparative Soap Formulation | Experimental Soap Formulation |
|---|---|---|
| Wire Time (s) | 98 | 91 |
| Liquid Volume-1 min. (mL) | 1 | 1 |
| Liquid Volume-2 min. (mL) | 1 | 1 |
| Liquid Volume-3 min. (mL) | 1 | 1 |
| Liquid Volume-4 min. (mL) | 25 | 1 |
| Liquid Volume-5 min. (mL) | 30 | 1 |
| Liquid Volume-14 min. (mL) | 125 | 105 |

Figure 6:
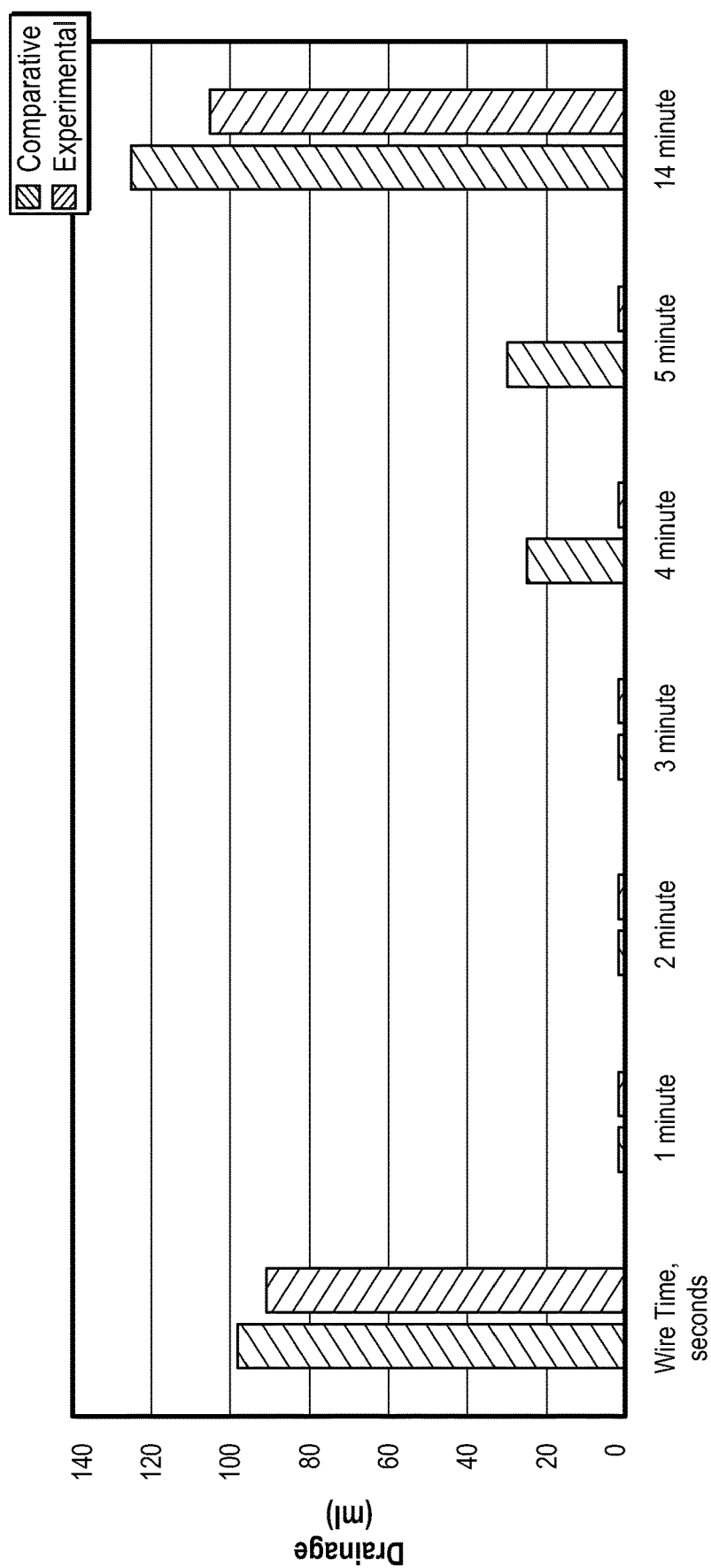
FIG. 6 shows a bar graph of Hart-DeGeorge Foam Test performance of an experimental soap formulation and a comparative soap formulation. The experimental soap formulation contains a reaction product of maltodextrin and lauric acid formed in the presence of cocamide diethanolamine, and the comparative soap formulation contains an equivalent mass of sodium lauryl sulfate, an anionic surfactant commonly used in soaps and personal care products.

The wire time data and liquid volume data is plotted in the bar graph shown in FIG. 6. As shown, the experimental and comparative soap formulations afforded similar wire time performance at substantially equivalent surfactant concentrations, thereby indicating a similar foam density. The experimental soap formulation, in contrast, afforded a superior foam as evidenced by the lower liquid volume collected in the graduated cylinder.

Replacement of Ethoxylate Alcohol Surfactants. A reaction product was formed by reacting maltodextrin with a mixture of dodecanoic acid ($C_{12}$ fatty acid) and myristic acid ($C_{14}$ fatty acid) in the presence of CocoDEA under the general conditions specified above. The reaction product was an opaque fluid, and no settling was observed. Similar to certain data above, the reaction product did not afford significant emulsification of crude oil. The reaction product was formulated at a standard concentration (Sample BB), as well as at half the standard concentration and double the standard concentration (Samples AA and CC, respectively). Surface tension, intrafacial tension, and contact angle values for these fluids are specified in Table 12 below.

Surface tension, intrafacial tension, and contact angle values for three oilfield friction-reducing fluids containing ethoxylated alcohol surfactants are also shown in Table 12 (Oilfield Fluids 1-3).

The ethoxylated alcohol surfactants in oilfield friction-reducing fluids 1-3 were replaced with an equivalent quantity of reaction product obtained from double-concentration Sample CC. Surface tension, intrafacial tension, and contact angle values for the modified oilfield friction reducing fluids are specified in Table 12. The modified oilfield fluids are designated Oilfield Fluids 1', 2' and 3', respectively.

TABLE 12

| Sample | Concentration (gpt) | Surface Tension (dynes/cm) | Intrafacial Tension (dynes/cm) | Contact Angle (°) |
|---|---|---|---|---|
| AA | 1 | 28.1 | 1.4 | 20.3 |
| | 2 | 28.0 | 0.6 | n/d |
| BB | 1 | 32.7 | 3.4 | 27.2 |
| | 2 | 29.8 | 1.8 | n/d |
| CC | 1 | 40.2 | 7.0 | 39.8 |
| | 2 | 32.8 | 3.8 | n/d |
| Oilfield Fluid 1 | 1 | 31.66 | 2.02 | 31.3 |
| | 2 | 29.45 | 1.11 | n/d |
| Oilfield Fluid 2 | 1 | 33.96 | 3.17 | 33.7 |
| | 2 | 30.60 | 2.06 | n/d |
| Oilfield Fluid 3 | 1 | 30.45 | 1.85 | 30.8 |
| | 2 | 28.76 | 0.98 | n/d |
| Oilfield Fluid 1' | 1 | 28.25 | 0.36 | 29.6 |
| | 2 | 27.79 | 0.27 | n/d |
| Oilfield Fluid 2' | 1 | 30.06 | 0.74 | 33.2 |
| | 2 | 28.14 | 0.56 | n/d |
| Oilfield Fluid 3' | 1 | 28.98 | 0.41 | 28.9 |
| | 2 | 27.79 | 0.30 | n/d |

As shown in Table 12, replacement of the ethoxylated alcohol surfactant in Oilfield Fluids 1-3 with a reaction product of the present disclosure afforded considerably lower surface tension and intrafacial tension values in each case. Surprisingly, the surface tension and intrafacial tension values were even lower than in the Sample CC reaction product itself. Moreover, the friction-reducing properties of Oilfield Fluids 1'-3' were not significantly changed from original Oilfield Fluids 1-3 (data not shown).

Unless otherwise indicated, all numbers expressing quantities and the like in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating various features are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While various systems, compositions, tools and methods are described herein in terms of "comprising" various components or steps, the systems, compositions, tools and methods can also "consist essentially of" or "consist of" the various components and steps.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Therefore, the disclosed systems, compositions, tools and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, compositions, tools and methods illustratively disclosed herein may suitably be practiced in the absence of any element that is not specifically disclosed herein and/or any optional element disclosed herein. While systems, compositions, tools and methods are described in terms of "comprising," "containing," or "including" various components or steps, the systems, tools and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is the following:

1. A composition comprising:
    an aqueous phase comprising an aqueous carrier fluid;
    a neutral surfactant or a reaction product thereof; and
    a reaction product of a saccharide polymer and a fatty acid, the saccharide polymer comprising a dextran, a dextrin compound, or any combination thereof, wherein the fatty acid consists of one or more straight chain fatty acids comprising about 4 to about 30 carbon atoms;
    wherein the neutral surfactant or the reaction product thereof and the reaction product of the saccharide polymer and the fatty acid are dissolved as a solution in the aqueous phase; and
    wherein the reaction product of the saccharide polymer and the fatty acid is present at a concentration effective to lower a surface tension of the neutral surfactant in the aqueous phase.

2. The composition of claim 1, wherein the saccharide polymer comprises a dextrin compound and the dextrin compound comprises a maltodextrin.

3. The composition of claim 1, wherein the fatty acid comprises at least one fatty acid selected from the group consisting of butyric acid, valeric acid, caproic acid, enanthic acid, caprylic acid, pelabonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, trioscylic acid, lignoceric acid, pentacosylic acid, cerotic acid, carboceric acid, montanic acid, nonacosylic acid, melissic acid, crotonic acid, cervonic acid, linoleic acid, linolelaidic acid, linolenic acid, arachidonic acid, docosatetraenoic acid, myristoleic acid, palmitoleic acid, sappenic acid, vaccenic acid, paullinic acid, oleic acid, pinolenic acid, stearidonic acid, eleostearic acid, elaidic acid, gondoic acid, gadoleic acid, erucic acid, eicosenoic acid, eicosadiencoic acid, eicosatrienoic acid, eicosatetraenoic acid, docosadienoic acid, nervonic acid, mead acid, adrenic acid, and any combination thereof.

4. The composition of claim 1, wherein the neutral surfactant comprises cocamide diethanolamine or a reaction product thereof.

5. The composition of claim 1, wherein the reaction product of the saccharide polymer and the fatty acid is formed in the presence of the neutral surfactant.

6. The composition of claim 1, wherein a molar ratio of fatty acid to saccharide polymer in the reaction product is about 0.2 or above on a basis of $moles_{fatty\ acid}$:$moles_{glucose\ monomers}$.

7. The composition of claim 1, wherein the reaction product of the saccharide polymer is obtained in the presence of water and a hydroxide base.

8. The composition of claim 1, wherein the reaction product of the saccharide polymer comprises a fatty ester reaction product.

9. A foamable formulation comprising the composition of claim 1.

10. The foamable formulation of claim 9, wherein the foamable formulation comprises a soap.

11. A method comprising:
   providing an aqueous fluid comprising the composition of claim 1; and
   inducing foam formation in the aqueous fluid.

12. The method of claim 11, wherein inducing foam formation comprises agitating the aqueous fluid to introduce gas thereto as a plurality of bubbles.

13. The composition of claim 1, wherein a molar ratio of fatty acid to saccharide polymer in the reaction product is about 0.2 to about 1.0 on a basis of $\text{moles}_{fatty\ acid}:\text{moles}_{glucose\ monomers}$.

* * * * *